(12) United States Patent
Kim et al.

(10) Patent No.: US 9,463,957 B2
(45) Date of Patent: Oct. 11, 2016

(54) WORMGEAR SHAPED DRIVING PART, ELEVATOR USING WORMGEAR SHAPED DRIVING PART AND ELEVATING SYSTEM

(75) Inventors: Nam Young Kim, Seoul (KR); Sung Jun Ju, Incheon (KR); Hyon Jo Ji, Seoul (KR)

(73) Assignee: COREEELEVATOR CO., LTD. (KR)

( * ) Notice: Subject to any disclaimer, the term of this patent is extended or adjusted under 35 U.S.C. 154(b) by 657 days.

(21) Appl. No.: 13/814,685

(22) PCT Filed: Aug. 3, 2011

(86) PCT No.: PCT/KR2011/005704
§ 371 (c)(1),
(2), (4) Date: Apr. 8, 2013

(87) PCT Pub. No.: WO2012/018224
PCT Pub. Date: Feb. 9, 2012

(65) Prior Publication Data
US 2013/0206514 A1  Aug. 15, 2013

(30) Foreign Application Priority Data

| Aug. 6, 2010 | (KR) | 10-2010-0075930 |
| Aug. 20, 2010 | (KR) | 10-2010-0080631 |
| Jan. 19, 2011 | (KR) | 10-2011-0005455 |
| May 4, 2011 | (KR) | 10-2011-0042267 |
| May 31, 2011 | (KR) | 10-2011-0052452 |

(51) Int. Cl.
*B66B 9/02* (2006.01)
*B66B 11/00* (2006.01)
(Continued)

(52) U.S. Cl.
CPC .............. *B66B 9/025* (2013.01); *B66B 9/003* (2013.01); *B66B 11/005* (2013.01); *B66B 11/0446* (2013.01); *F16H 25/122* (2013.01); *Y10T 74/18792* (2015.01)

(58) Field of Classification Search
CPC ...... B66B 9/025; B66B 9/003; B66B 11/005; B66B 11/0446; F16H 25/122
USPC ................................ 187/271, 240; 74/89.14
See application file for complete search history.

(56) References Cited

U.S. PATENT DOCUMENTS

| 647,491 A * | 4/1900 | Hoffmann | F16C 13/006 |
| | | | 187/271 |
| 696,994 A * | 4/1902 | Modry | B66B 9/025 |
| | | | 187/271 |

(Continued)

FOREIGN PATENT DOCUMENTS

| JP | 07291553 | 11/1995 |
| KR | 100361268 B1 | 11/2002 |
| KR | 1020020087039 A | 11/2002 |

OTHER PUBLICATIONS

PCT/KR2011/005704 International Search Report mailed Apr. 4, 2012.

*Primary Examiner* — Michael Riegelman
(74) *Attorney, Agent, or Firm* — Kunzler Law Group, PC

(57) ABSTRACT

An elevator moving along an elevator shaft in a building, comprises a car for transport, a worm driving part moving together with the car, a rotating axis of which is parallel to a moving path of the car, and a worm support part including supporting teeth installed in the elevator shaft along the moving path of the car in accordance with worm teeth of the worm driving part. Using the worm driving part and the worm support part mutually interacting, the elevator can go up and down, and the worm driving part and the worm support part keep low frictional resistance to improve an efficiency of lifting.

6 Claims, 24 Drawing Sheets

(51) Int. Cl.
 *B66B 11/04* (2006.01)
 *B66B 9/00* (2006.01)
 *F16H 25/12* (2006.01)

(56) References Cited

U.S. PATENT DOCUMENTS

| | | | | |
|---|---|---|---|---|
| 698,738 | A * | 4/1902 | Roney | B66B 9/025 187/271 |
| 1,337,732 | A * | 4/1920 | Stoller | F16H 49/005 310/103 |
| 1,539,761 | A * | 5/1925 | Murray | E04H 6/282 187/267 |
| 1,953,772 | A * | 4/1934 | Phillips | B66B 9/10 187/249 |
| 3,215,227 | A * | 11/1965 | Macchesney | B66B 9/025 187/271 |
| 3,814,962 | A * | 6/1974 | Baermann | H02K 49/102 310/103 |
| 4,051,923 | A * | 10/1977 | Blanchette | B66B 5/027 187/271 |
| 4,285,249 | A * | 8/1981 | Kume | B66B 9/02 74/424.93 |
| 4,541,297 | A * | 9/1985 | Fujita | F16H 1/166 74/424.6 |
| 5,234,079 | A | 8/1993 | Nomura | |
| 6,755,283 | B2 * | 6/2004 | Lin | B66B 9/025 182/141 |
| 8,402,850 | B2 * | 3/2013 | Delaney | F16H 25/2409 182/141 |
| 2002/0125075 | A1 | 9/2002 | Lin | |
| 2005/0056493 | A1 * | 3/2005 | Molnar | B66B 9/025 187/271 |
| 2005/0230193 | A1 * | 10/2005 | Oh | B66B 1/50 187/394 |

* cited by examiner

WORMGEAR SHAPED DRIVING PART, ELEVATOR USING WORMGEAR SHAPED DRIVING PART AND ELEVATING SYSTEM

TECHNICAL FIELD

The present invention relates to an elevator or other lifting devices, more particularly, relates to an elevator which can move an elevator car without wire or rope.

BACKGROUND ART

The elevator is a device which transmits people or goods vertically against gravity, which is used in many buildings. Generally, the elevators may be divided into rope-type elevators and hydrodynamic elevators according to their driving mechanism, or may be divided into screw-type and rack-n-pinion-type. In these days, elevators using a linear motor instead of an elevator traction machine have appeared.

The rope-type elevator comprises a machine room for driving the elevator at the highest floor, the traction machine of which connects a car and a balance weight via a rope to move the car vertically. The machine room for the traction machine has a several limitations, such as its height and weight, to adversely affect the building design.

As the number of the skyscrapers increases, high-speed elevators which can move at speeds over 60 km/h (1000 m/min) have been actively developed. Moreover, newly developed are double-deck elevators which transmit two cars at once and twin elevators which transmit two cars independently.

The high-rise buildings need a high-speed elevator in order to effective vertical transportation. To increase the velocity of the rope-type elevator, its rope must endure a tension proportional to the square of the velocity. Accordingly, as increasing the speed of the elevator, its ropes or wires should have a thicker cross-section and a heavier weight. Moreover, since the length of the ropes should be as long as the height of the high-rise building, the ropes should be much thicker because of the weight of itself, if not by the elevator velocity. In the end, the ropes of the elevator might be heavier than the car in the high-rise buildings or skyscraper.

For reference, the elevators may be divided into low-speed elevators which move at speed of below 45 m/min, mid-speed elevators which move at speed of about 60~105 m/min, high-speed elevators which move at speed of 120~300 m/min, and ultrahigh-speed elevators which move at speed of over 360 m/min.

Actually, one of the ultrahigh-speed elevators of "Burj Dubai" building is known to have about 20 tons of ropes. Considering the chains and the balance weights, the ultra-high-speed elevator must need much larger power to increase its speed. Thus, the traction machine of the high-speed elevator in the high-rise buildings should be more powerful and bigger than those of other normal elevators.

The longer the elevator rope is, the more difficult the control of the elevator stop position is, due to the rope's inertia, the rope's elasticity dependent on temperature and the like. So, the elongation of the elevator rope makes elevator control more difficult and complicated.

On the other hand, there is a screw-type elevator which uses a long pole with male screw and a sleeve with female screw attached on the elevator car. The screw-type elevator transports the car by rotating the long pole, so as to be applied as a simple or small-size elevator.

However, it is expected that ropeless elevators may be used into over 100 stories of buildings instead of the conventional rope-type elevators. U.S. Pat. No. 5,234,079 discloses a elevator applying a linear motor. Since this linear elevator moves in hanging in the air without rope, the elevator might be rather dangerous and needs double or triple safety lock devices.

DESCRIPTION

Technical Problem

The present invention provides a kind of ropeless elevator.

The present invention provides an elevator which uses a physical structure for more safety and improves the energy efficiency by reducing or removing the friction.

The present invention provides an eco-friendly elevator which has high feasibility and renewable energy effect.

Technical Solution

According to one exemplary embodiment of the present invention, an elevator moving along an elevator shaft in a building, comprises a car for transport, a worm driving part moving together with the car, a rotating axis of which is parallel to a moving path of the car, and a worm support part including supporting teeth installed in the elevator shaft along the moving path of the car in accordance with worm teeth of the worm driving part. Using the worm driving part and the worm support part mutually interacting, the elevator of the present invention can go up and down, and the worm driving part and the worm support part keep low frictional resistance to improve an efficiency of lifting. The worm support part may be provided on an inner or outer wall of the elevator shaft or elevating passage, and include plurality of the supporting teeth which are engaged with the worm teeth of the worm driving part. The physical engagement between the worm teeth and the supporting teeth can prevent the car from falling by gravity, even when power failure.

The worm driving part may include a worm gear body which looks like a worm gear and is engaged with the supporting teeth of the worm support part, to make the car go up and down. The worm driving part may produce lifting power enough to carry the car, and, in a case that the supporting teeth are arranged by a uniform gap of about 40 cm, the worm gear body rotating at rotating speed of about 900 rpm can carry the car at moving speed of about 360 m/min, which is ultrahigh speed. As increasing the rotating speed, the worm gear body can increase the moving speed up to about 600~1500 m/min.

Basically, the worm driving part and the worm support part mutually interacting can move the car vertically, without using ropes or wires. Accordingly, the elevator using the worm driving part according to the present invention can overcome inefficiency due to the rope weight, even if in the high-rise buildings or the skyscrapers. Namely, not requiring dozen tons of ropes, the elevator can use energy efficiently.

Since the worm driving part and the worm support part are physically engaged through gear combination, safety accidents such as a car drop accident may be prevented without any protection even if power failure occurs. Though the conventional ropeless elevator might use a brake device, it prevents the car from falling only using friction force, which is very different from the present invention for preventing the car's drop by using physically supporting force.

Compared to the conventional worm gear set, the present invention may use a rotating body, such as a roller or a wheel, provided between the worm driving part and the worm support part, so that electric power supplied to the elevator may be used to increase potential energy of the car without friction loss. Because of using rolling contact, the worm teeth of the worm driving part may slide on the rollers smoothly, to bring out low noise, low vibration, and outstanding durability.

In this specification, the "building" may be understood as including a general building, a tower, an apartment and other constructions, as well as including any structure connecting with constructions or places. Moreover, the "elevator shaft" may be understood as including not only any vertical or horizontal closed space but also wholly or partially opened space.

The "car" may be understood as a thing to support, protect or carry a person or a good, which may be provided to have open or closed room. The car may be provided with rail or other guide structures additionally.

In this specification, the "low resistance" may be understood as an artificially improved contact to have reduced friction rather than direct friction, which might use a roller, a mechanical bearing, an air bearing, magnetic levitation and the like.

The worm driving part and the worm support part may form plurality of contacts of the worm teeth and the supporting teeth, in which the contact may form the low resistance using permanent magnet or electromagnet, so that the worm teeth can smoothly slide on the supporting teeth without friction.

Advantageous Effects

Since the elevator of the present embodiment do not use ropes or wires, it can overcome the inefficiency due to heavy weight of the ropes or wires. Especially in high-rise buildings or ultrahigh-speed elevators, considerable energy saving effect may be expected.

The conventional rope-type elevators have many spatial limitations because of its ropes. In case of designing a twin elevating system, the ropes actually cause many problems. However, by using the worm driving part, the elevator of the present invention can save or economize the space for ropes and balance weights. Because of requiring no rope, various elevating system, such as twin or triple elevators, may be easily designed to have various components and combinations.

The elevator of the present invention can save or reduce the number of the elevator shafts, and provide some possibilities to utilize the saved space efficiently for not elevator shaft but other purposes, such as living space, official space or public space. The building owner may obtain enlarged sale or rental space by keeping substantially equal traffic efficiency.

Even if the worst accidents like power failure or brake failure occur, the elevator of the present invention will not experience any risk like the car drop accident. Due to structural characteristic of the worm gear, the car's lowering loses its speed or stops even if the motor stops. In case that the elevator keeps going down, it moves down slowly enough to protect the passengers.

Compared to going up, going down of the car may be possible with considerably energy consumption. In case of induction generating, it is possible to renew or recharge electric energy. As mentioned the above, for example in case of power failure by an accident, the elevator going down may make electric power which can be used for minimal control, minimal communication and minimal self-helping.

By using a rotating body like a roller for low resistance, the simple structure can expect the highest effect. The roller rolling on the supporting tooth forms very little friction to consume very little power. The supporting tooth of the worm support part is temporarily used only when the worm tooth passes thereon, the average life of the worm support part is substantially infinite.

In the conventional rope-type elevating system, as the building is higher, the length and the number of the ropes get increased. The elongated and fast-moving ropes need complicate and high-cost technologies, and cause lots of problems. But, the elevating system of the present invention can accommodate Manhattanization of the buildings by simply adding worm support part, and can control the moving speed by controlling the rotating speed of the worm driving part.

The elevating system of the present invention needs no machine room at the top, so that it is possible to design the building freely without any limitation or burden regarding to the machine room.

The driving motor of the worm driving part may be provided outside or inside the worm gear body. In case of installing the driving motor inside the worm gear body, the worm driving part may have considerable reduced weight and volume, with highly improved power and efficiency.

Ropeless elevators may travel simultaneously in one elevator shaft like subways on a rail keeping a safe distance, and the space and the number for the elevator shafts may be saved very much. Since there is no limit regarding to ropes, the elevator may travel with no limit about its travel range and rope replacement time.

Since the worm driving part and the car travel independently along the worm support part, the car may move along not only vertical path but also inclined path, and along not only straight path but also curved path.

MODE FOR INVENTION

Below with reference to the attached drawings, preferred exemplary embodiments of present invention is described in detail, but present invention is not limited or restricted by the below exemplary embodiment of present invention. For reference, same number means same element practically, wherein may explain quoting the content mentioned at another drawing according to this rule, and the obvious and repeated contents are skipped to dealer.

Figure 1:
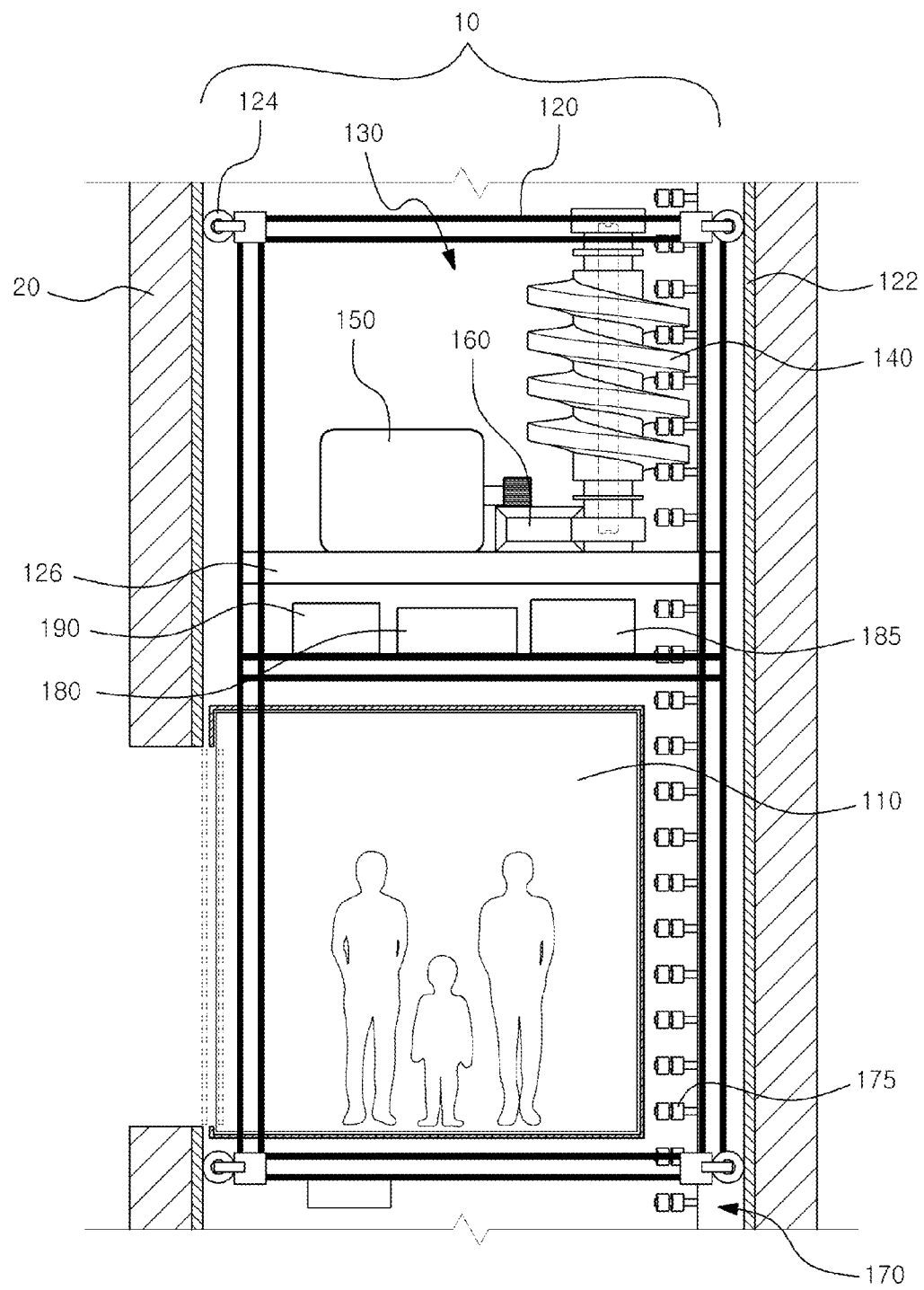
FIG. 1 is a front sectional view illustrating an elevator according to one embodiment of the present invention.
Figure 2:
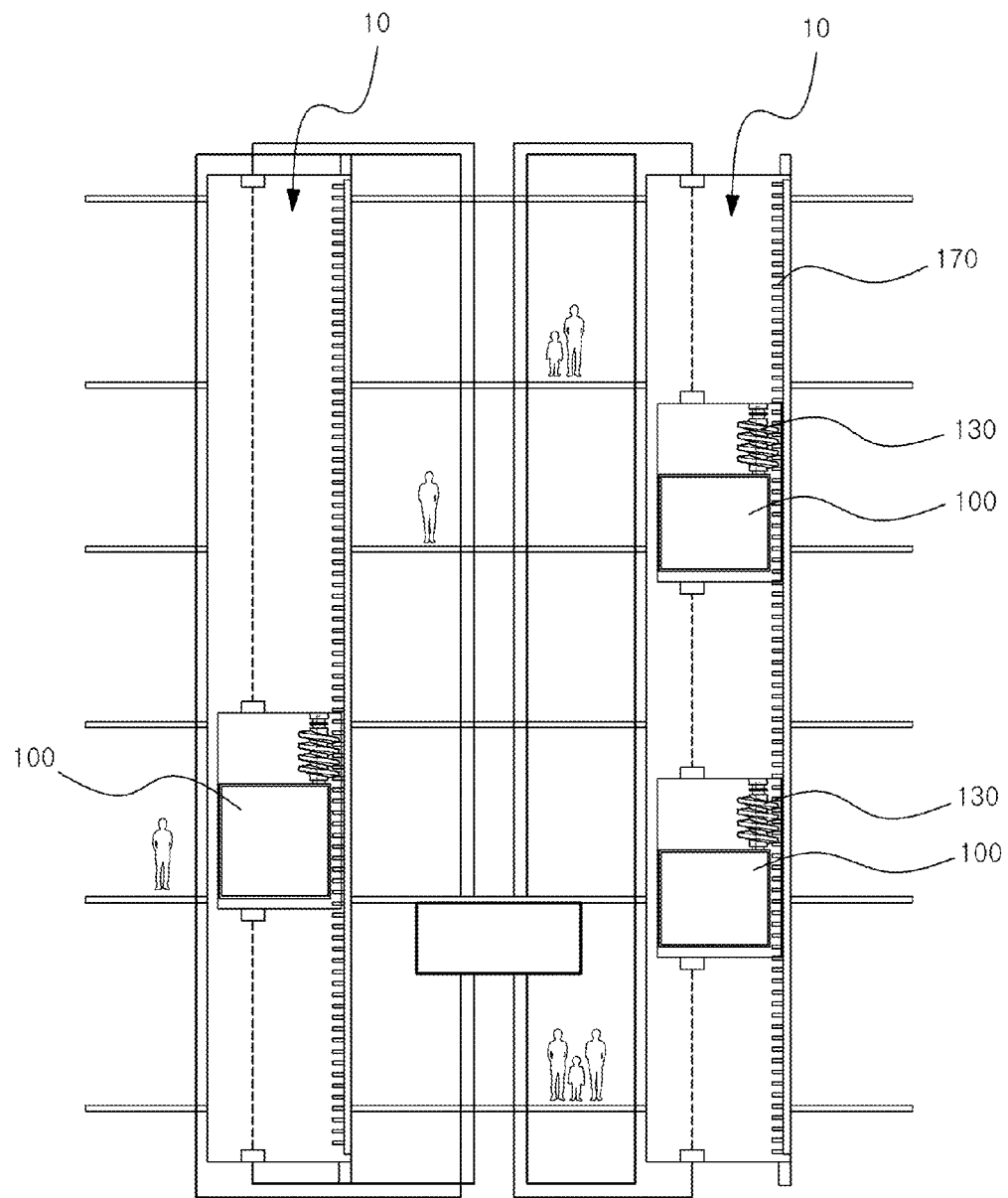
FIG. 2 is a schematic view illustrating an elevating system utilizing the elevator of FIG. 1.

FIG. 1 is a front sectional view illustrating an elevator according to one embodiment of the present invention, and FIG. 2 is a schematic view illustrating an elevating system utilizing the elevator of FIG. 1.

Referring to FIGS. 1 and 2, an elevator 100 of the present embodiment comprises a car 110, an elevating frame 120, a worm driving part 130 and a worm support part 170, in which the car 110 of the elevator 100 travels along an elevator shaft 10 in a building by interaction between the worm driving part 130 and the worm support part 170. The elevator 100 may further comprises an independent control part 180, an air conditioner 185 and a wireless communication module 190, to help a normal operation of the elevator 100.

The worm driving part 130 includes a worm gear body 140 in a shape of a worm gear, on outer surface of which worm teeth 142 are formed. The worm gear body 140 has a rotating axis aligned parallel to a moving path of the elevator 100 to rotate around the rotating axis. Against the worm teeth 142 of the worm driving part 140, the worm support part 170 is provided in the elevator shaft 10 to include rollers 175 arranged by a uniform gap.

The worm driving part 130 rotates the worm gear body 140 in the elevator, the worm teeth of the worm gear body 140 are supported on the rollers 175 of the worm support part 170, and, when the worm gear body 140 rotates, the worm driving part 130 goes up and down together with the car 110 by sliding on the rollers 175 of the worm support part 170.

Since the worm driving part 130 moves together with the car 110, the elevator 100 needs neither rope nor wire, and needs neither machine room nor traction machine. Namely, the worm driving part 130 may be installed over or under the car 110 to move the car 110 upwardly or downwardly independently.

Accordingly, the elevator 100 may have a simplified driving structure and may be free from the many burdens like a huge rope weight in a high-rise building. The elevator 100 may be free from the other burdens like interference between the ropes and installation of balance weights.

In view of efficiency, low resistance like rolling contact is formed between elements, so that the rotation energy of the motor can be transferred into potential energy of the car with reduced energy consumption. Going down of the elevator needs minimal energy to control the speed or stop position of the car. The worm driving part 130 may perform initial acceleration, low speed control, high speed control and deceleration very easily via general motor control method.

As shown in FIG. 2, the ropeless elevator 100 including the worm driving part 130 may perform various moving speeds. For example, in case that the worm gear body 140 proceeds by one pitch of about 25~40 cm in accordance with the supporting teeth of the worm support part 170, the worm driving part 130 rotating at speed of about 2,000 rpm can move at speed of about 500~800 m/min. At the left of the drawing, an ultrahigh-speed elevator can be easily realized by the worm driving part.

At the right of FIG. 2, illustrated is a twin elevating system which carries two or more of cars 110 in one elevator shaft. Because of using no rope, two or more of the cars 110 can travel independently in the identical passage and be controlled through the wireless communication module 190 installed on the cars 110 respectively. Especially, since there is no obstacle in the straight elevator shaft 10, the wireless communication between the cars 110 may be very easy and prompt.

Supposing the worst accidents like power failure or brake failure, the car 110 would not fall powerlessly. Due to structural characteristic of the worm gear, the car's lowering loses its speed or stops even if the motor stops. In case that the elevator keeps going down, it moves down slowly enough to protect the passengers.

Referring to FIG. 1 again, the car 110 guided by the elevating frame 120 may move stably in the elevator shaft, and the rollers 124 positioned at corners of the elevating frame 120 can guide the car 110 in the elevator shaft 10 without rattling. In the present embodiment, the worm driving part 130 is mounted on a support frame 126, and the car 110 and the elevating frame 120 move together by the worm driving part 130. Similarly to the conventional elevator guide structure, T-shaped rail may be installed in the elevator shaft parallel to the moving path of the car 110.

The worm driving part 130 may include a worm gear body 140, a driving motor 150 and a transmission box 160. The driving motor 150 may be located outside the worm gear body 140, to make the worm gear body 140 rotate in both directions via the transmission box 160. The worm gear body 140 is supported at the top and the bottom ends by bearings and rotated by the driving motor 150.

Figure 3:
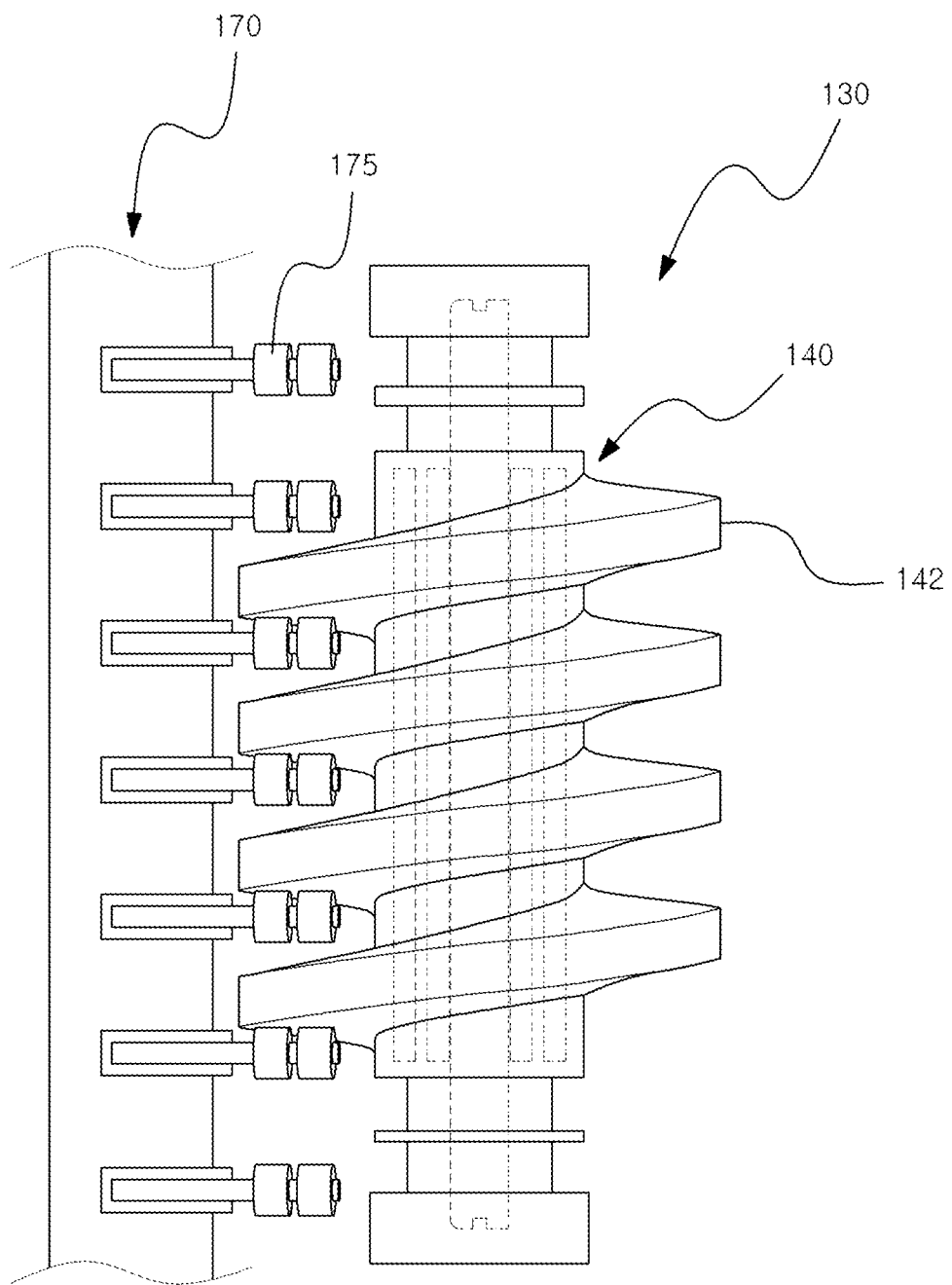
FIG. 3 is a front view illustrating an engagement between the worm driving part and the worm support part.
Figure 4:
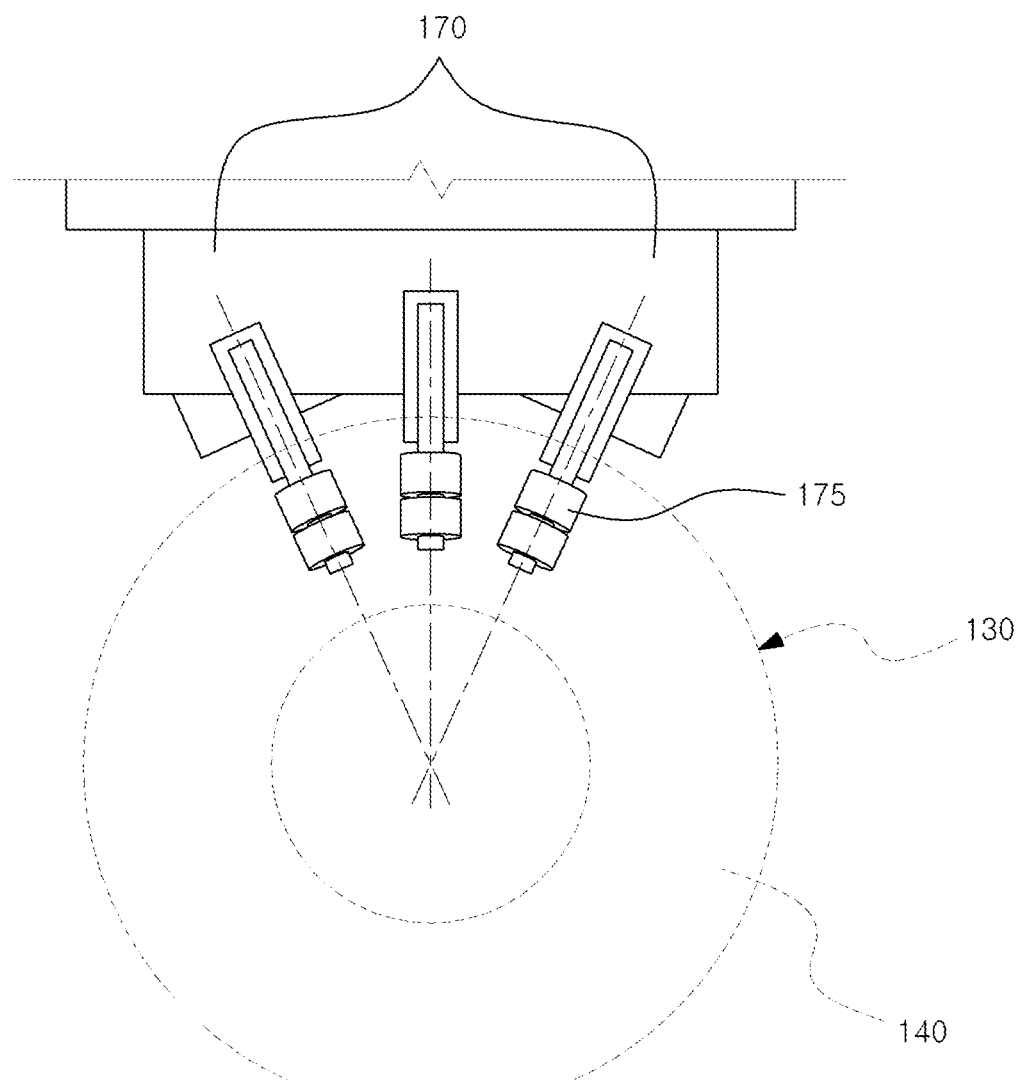
FIG. 4 is a plan view illustrating the engagement between the worm driving part and the worm support part.

FIG. 3 is a front view illustrating an engagement between the worm driving part and the worm support part, and FIG. 4 is a plan view illustrating the engagement between the worm driving part and the worm support part.

Referring to FIGS. 3 and 4, the worm support part 170 includes the rollers 175 arranged by a uniform gap, in which one or two of the rollers 175 may be mounted at every roller axis. The rollers 175 may serve as the supporting teeth and have urethane coating thereon for vibration absorption or dampening.

The rollers 175 may rotate on bearings and keep rotating contacts with the worm teeth of the worm gear body 140, so as to support the worm driving part 130 vertically and not to disturb the rotation of the worm driving part 130.

Since plurality of the rollers 175 aligned vertically support the worm teeth of the worm gear body 140, they can disperse the weight loaded on the worm teeth of the worm gear body 140. The rollers 175 may keep contacts with the worm gear body 140 to help it rotate steadily.

Otherwise, the rollers 175 may be arranged along an arc line in accordance with the shape of the worm teeth. The rollers 175 may be arranged parallel to the rotating direction of the worm teeth, namely circumferential direction. The rotating axis of the rollers 175 is directed to focus on a center of the worm gear body 140. The rollers 175 may be provided not only in a shape of a cylinder, but also in a shape of a Frisbee or a sphere.

In the present embodiment, the worm teeth of the worm gear body 140 are supported on the rollers 175. Otherwise, the worm teeth may be supported on other rotating bodies, such as ball bearing having no fixed rotating axis like a ball joint or very thin bearing surface. The worm teeth may be supported by air bearing or magnetic levitation without direct contact, for low resistance.

In the present embodiment, the worm gear body 140 and the rollers 175 contact to each other with neither friction nor heat, and improved bearing may be the reason to reduce the noise and vibration. Actually, the roller 175 temporarily rotates only when the worm tooth passes thereon, the average life of the rollers 175 is substantially infinite.

The driving motor 150 of the worm driving part 130 keeps an electric power connection with a power supply line 122 provided on the rail, so as to receive electric power steadily. Additionally, the power supply line may be formed on inner wall of the elevator shaft 10. Moreover, the driving motor may operate by receiving electric power from a battery which gets recharged whenever the car stops for passengers riding.

Figure 5:
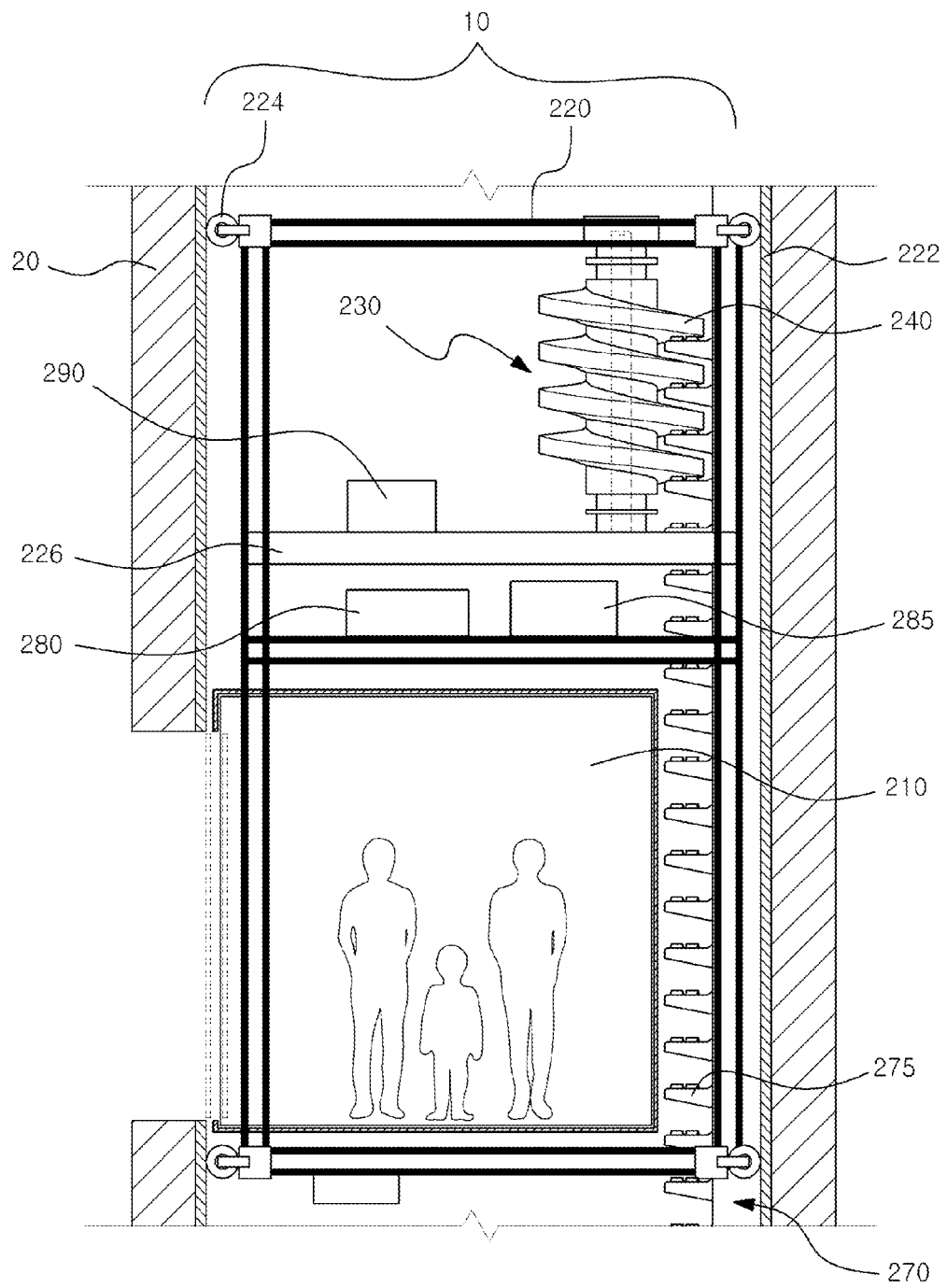
FIG. 5 is a front sectional view illustrating an elevator according to another embodiment of the present invention.
Figure 6:
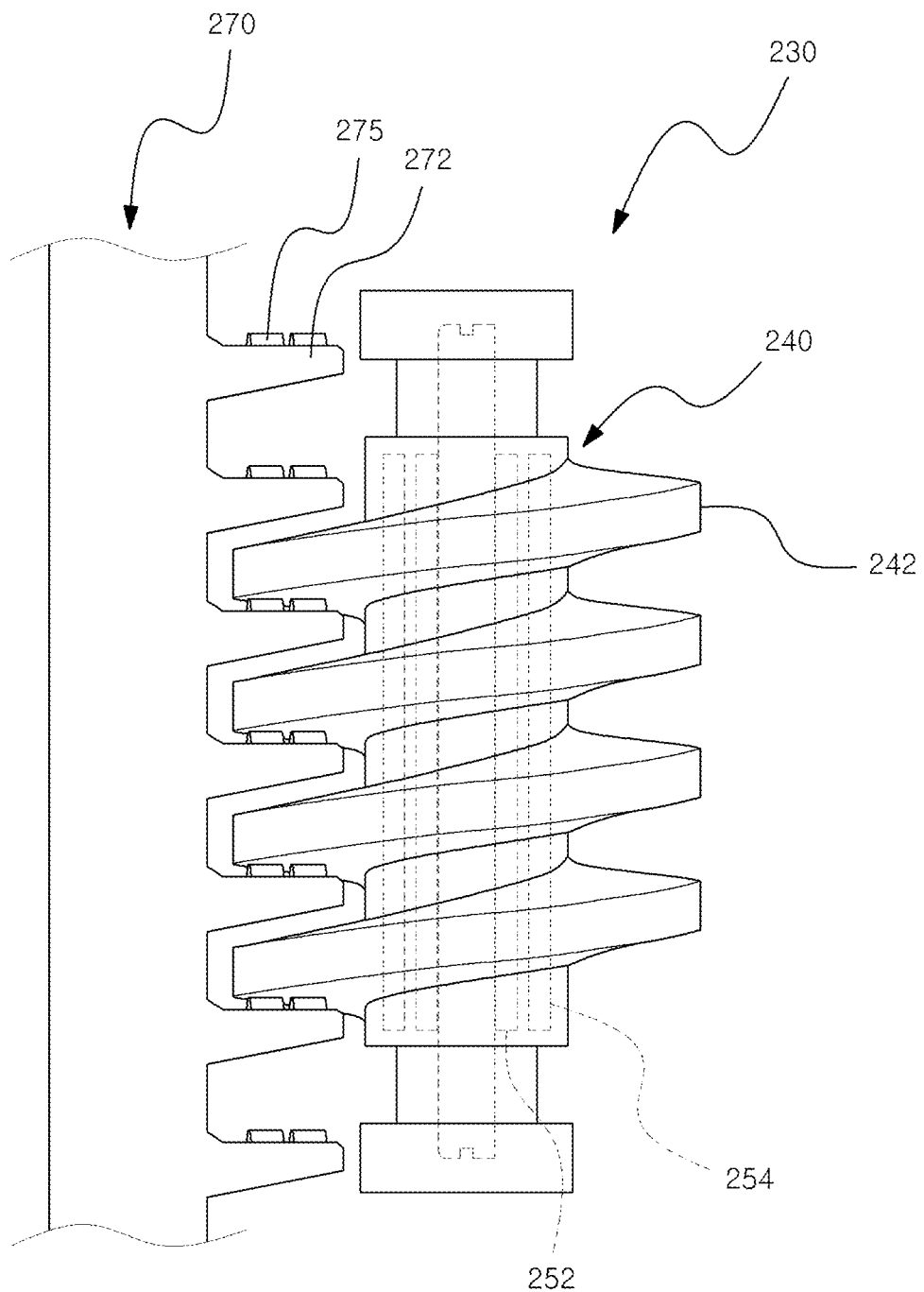
FIG. 6 is a front view illustrating an engagement between a worm driving part and a worm support part of FIG. 5.
Figure 7:
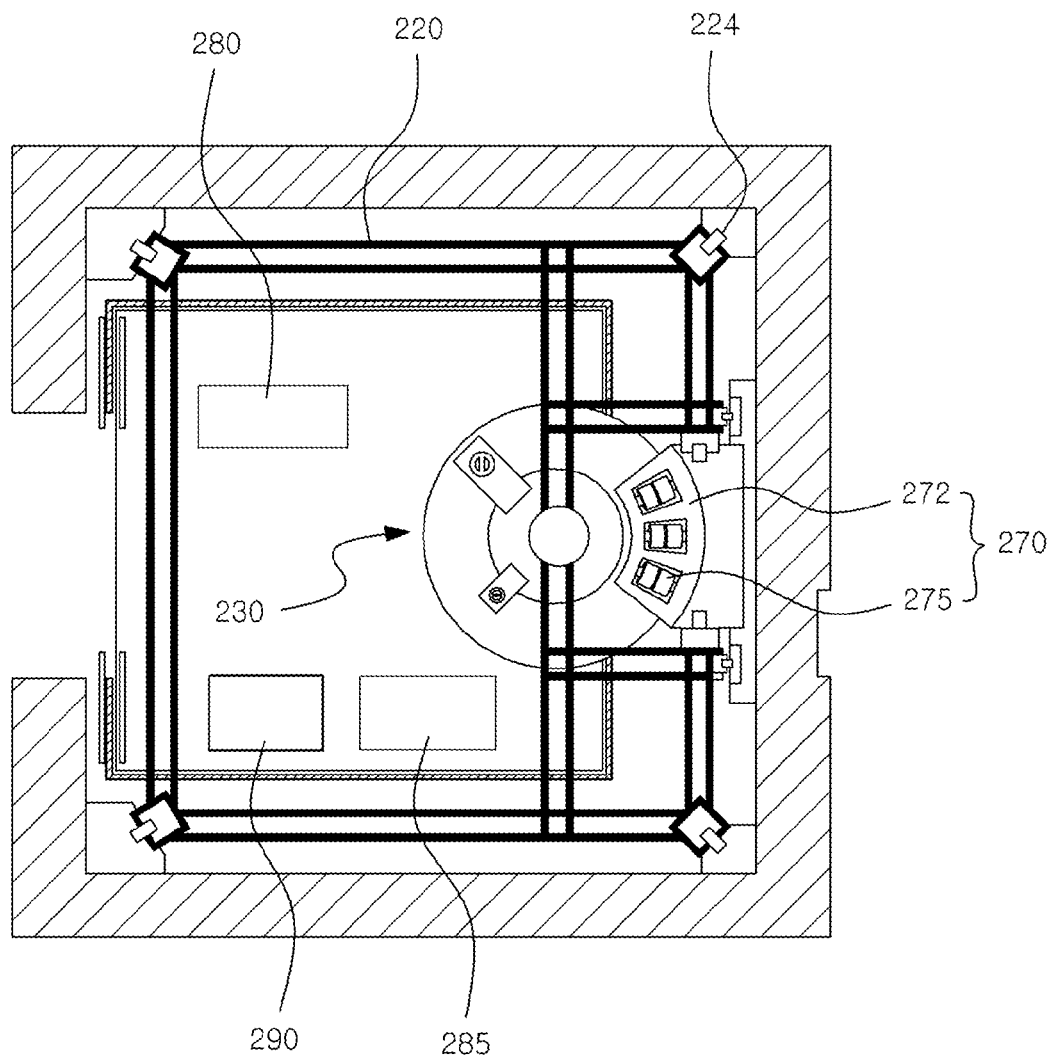
FIG. 7 is a plan view illustrating the engagement between the worm driving part and the worm support part of FIG. 5.

FIG. 5 is a front sectional view illustrating an elevator according to another embodiment of the present invention, FIG. 6 is a front view illustrating an engagement between a worm driving part and a worm support part of FIG. 5, and FIG. 7 is a plan view illustrating the engagement between the worm driving part and the worm support part of FIG. 5.

Referring to FIGS. 5 to 7, an elevator 200 of the present embodiment comprises a car 210, an elevating frame 220, a worm driving part 230 and a worm support part 270, in which the car 210 of the elevator 200 travels along an elevator shaft 10 in a building by interaction between the worm driving part 230 and the worm support part 270. The elevator 200 may further comprises an independent control part 280, an air conditioner 285 and a wireless communication module 290, to help a normal operation of the elevator 200.

The worm driving part 230 includes a worm gear body 240, on outer surface of which worm teeth 242 are formed. The worm gear body 240 has a rotating axis aligned parallel to a moving path of the elevator 200 to rotate around the rotating axis.

Against the worm teeth 242 of the worm driving part 240, the worm support part 270 includes supporting teeth 272 formed in a shape of a rack gear in the elevator shaft. In the present embodiment, the supporting teeth 272 of the worm support part 270 are arranged by a uniform gap, to fix rollers 275 of which upper portions are partially opened toward the bottom of the worm teeth 242.

The worm gear body 240 may contain an inner motor member inside. The worm gear body 240 may be formed as a hollow body to contain the inner motor member and have the top and the bottom ends mounted on bearings. The inner motor member includes a stator 252 provided on a rotating axis and a rotator 254 provided on an inner side of the worm gear body 240. The stator 252 and the rotator 254 may be provided as a combination of permanent magnet and electromagnetic coil or as a combination of electromagnetic coils.

The worm teeth of the worm gear body 240 are supported on the rollers 275, which is exposed from the top of the supporting teeth 272, and slide on the rollers 275 of the worm support part 270 while the worm gear body 240 rotates to go up and down with the car 210.

Supposing the worst accidents like power failure or brake failure, the car 210 would not fall powerlessly. Due to structural characteristic of the worm gear, the car's lowering loses its speed or stops even if the motor stops. In case that the elevator keeps going down, it moves down slowly enough to protect the passengers.

The worm driving part 230 comprises the worm gear body 240 which contain the inner motor member therein, so as to perform initial operation, acceleration, deceleration and stop without any help of the transmission or the decelerator, smoothly and silently.

Figure 8:
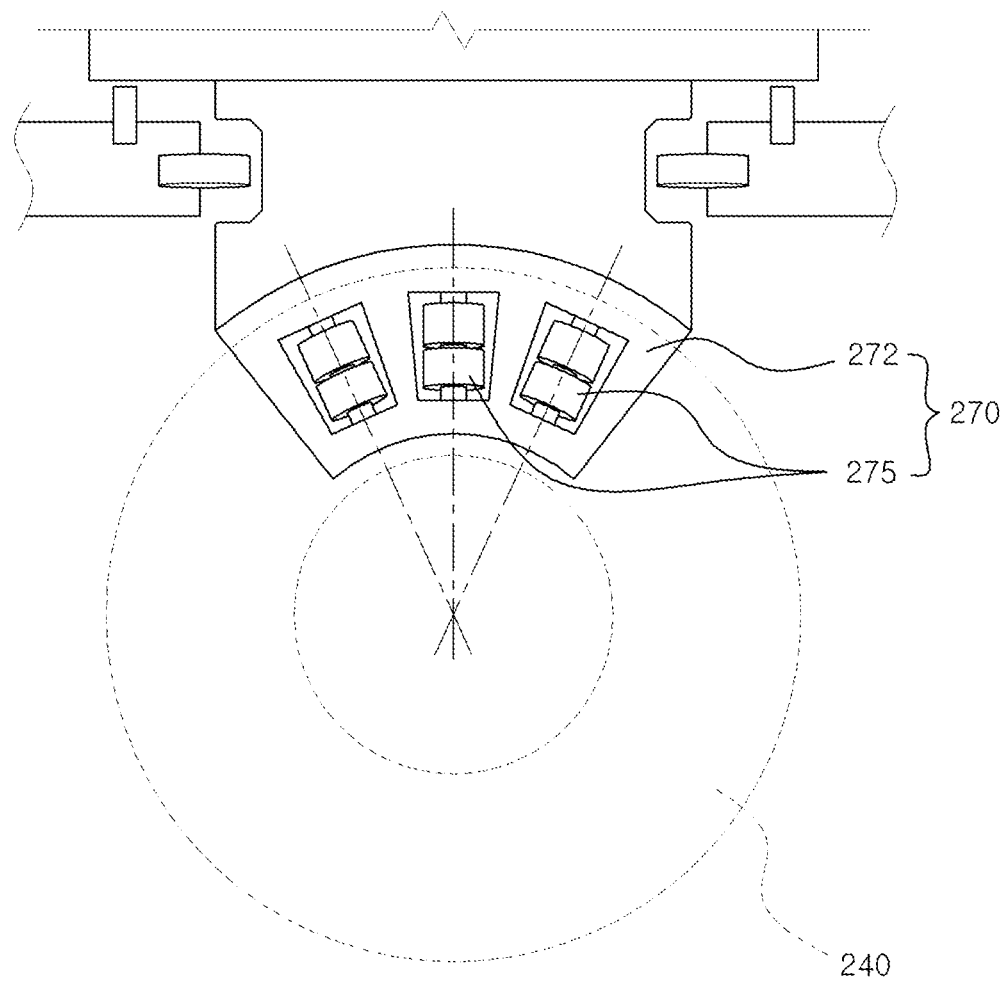
FIG. 8 is a plan view illustrating the engagement between the worm driving part and the worm support part of FIG. 5.

FIG. 8 is a plan view illustrating the engagement between the worm driving part and the worm support part of FIG. 5.

Referring to FIGS. 6 to 8, the worm support part 270 includes the rollers 275 provided in the supporting teeth 272 which are arranged by a uniform gap. Several of the rollers 275 may be mounted at every roller axis. The rollers 275 may have a rigid body and have urethane coating thereon for vibration absorption or dampening.

Pairs of the rollers 275 may be aligned inclinedly according to the inclined bottom surface of the worm tooth and may be mounted to have a minute stair gap. Each of the rollers 275 rotates on a bearing, and keeps rolling contact with the worm tooth to support the worm driving part vertically.

Since plurality of the rollers 275 support the worm teeth of the worm gear body 240, the weight or load transmitted to the worm teeth may be dispersed and the rollers 275 may support the worm gear body 240 stably.

The roller 275 may further include a spring or damping structure to elastically support the roller axis. The rollers 275 may be arranged along an arc line in accordance with the shape of the worm teeth. The rollers 275 may be arranged parallel to the rotating direction of the worm teeth, namely circumferential direction. The rollers 275 may be provided not only in a shape of a cylinder, but also in a shape of a Frisbee or a sphere.

Figure 9:
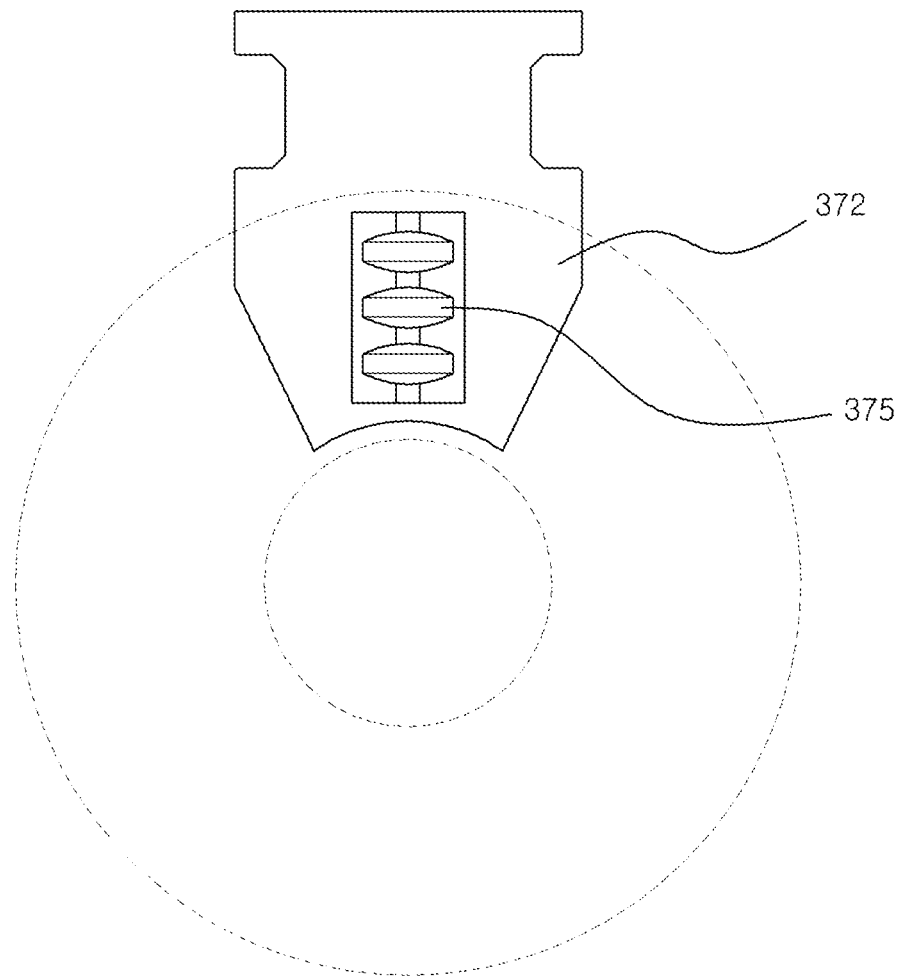
FIG. 9 is a plan view illustrating a worm support part according to still another embodiment of the present invention.

FIG. 9 is a plan view illustrating a worm support part according to still another embodiment of the present invention.

Referring to FIG. 9, the worm support part includes plurality of supporting teeth and rollers mounted in the supporting tooth. A series of three rollers 375 are rotatably mounted in the supporting tooth 372. The rollers 372 are mounted parallel to each other to rotate at minutely different speed respectively.

Figure 10:
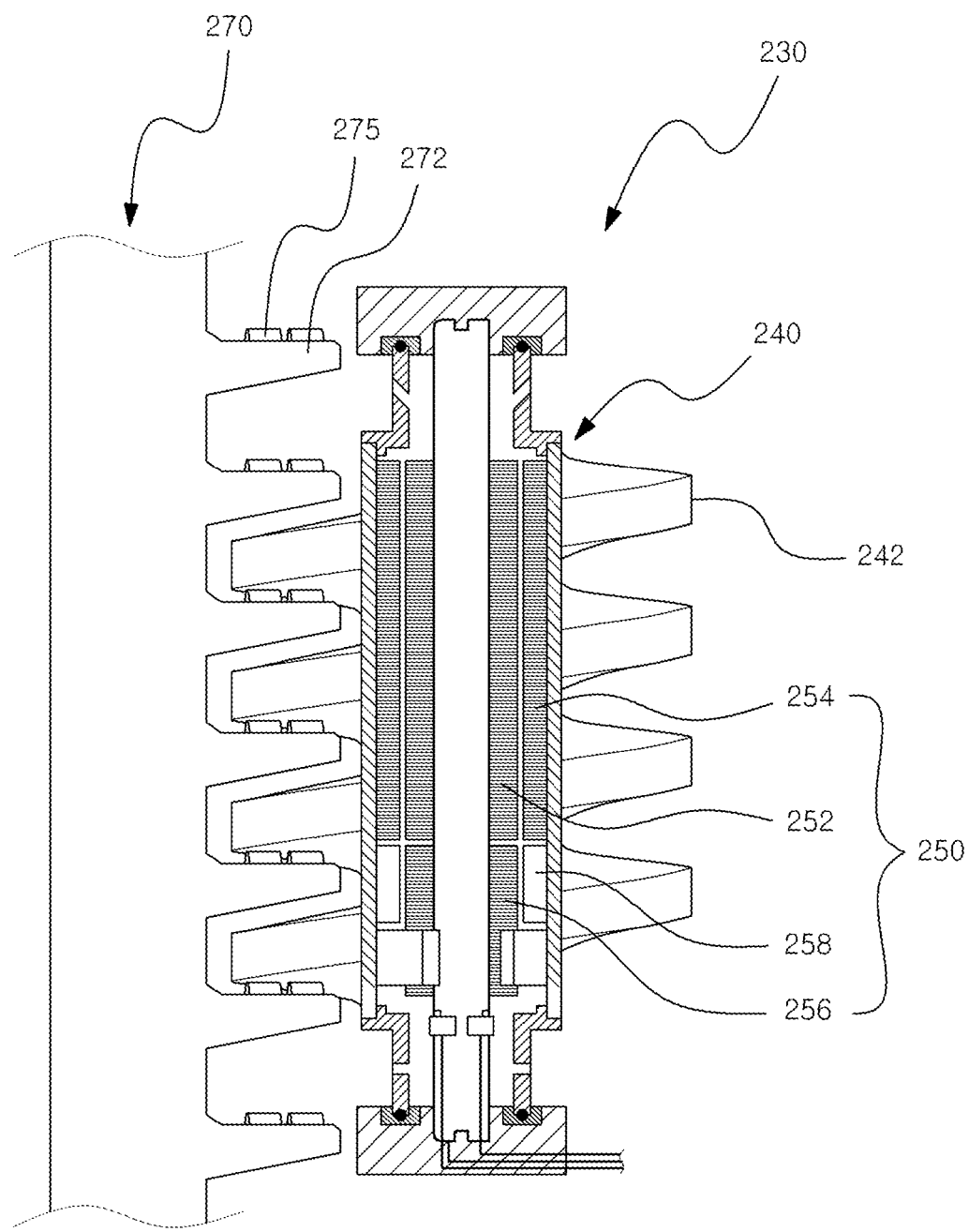
FIG. 10 is a sectional view illustrating a worm driving part according to one embodiment of the present invention.

FIG. 10 is a sectional view illustrating a worm driving part according to one embodiment of the present invention.

Referring to the FIG. 10, the worm driving part 230 comprises a worm gear body 240 on which worm teeth 242 are formed like a worm gear and an inner driving module 250 in the worm gear body 240 with stators and rotators. The worm gear body 240 may rotate the rotating axis fixed to the elevating frame and be supported by bearings 246 at both ends for frictionless rotation.

The inner driving module 250 formed inside the worm gear body 240 includes two pairs of the stator and the rotator. The worm gear body 240 is provided as a hollow body to contain the inner driving module. Inside the worm gear body 240, a coil stator 252 and a coil rotator 254 are provided at upper portion, and another coil stator 256 and a magnet rotator 258 are provided at lower portion. In other embodiments, coil stator or coil rotator may be provided by using coil or steel-core.

The worm driving part can control the rotating torque and speed of the worm gear body 240, by using the stators and the rotators, and expect induction generating by the rotation of the worm gear body 240 when moving down. For example, in case that the elevator moves down, the rotation of the rotator around the stator can cause electricity generation to be useful for the efficient use of energy.

Cogging reaction between the magnet and the coil may be controlled by adjusting the gap of the magnet and the coil. In case of power failure, the cogging reaction in the worm gear body 240 may be useful to decelerate the rotating speed of the worm gear body 240.

As mentioned the above, the worm teeth of the worm gear body 240 are supported on the rollers 275 which is exposed from the top of the supporting teeth 272, and slide on the rollers 275 of the worm support part 270 while the worm gear body 240 rotates to go up and down with the car 210. Low resistance between the worm diving part and the worm support part is due to a rolling contact using rollers in the present embodiment, while another low resistance may be due to magnetic force to float the worm teeth in the air.

Referring to the drawing again, the worm gear body 240 may have ventilation holes 248 at the upper portion and the lower portion respectively. The ventilation holes 248 enable the air to pass the inside of the worm gear body 240 to help heat release.

Figure 11:
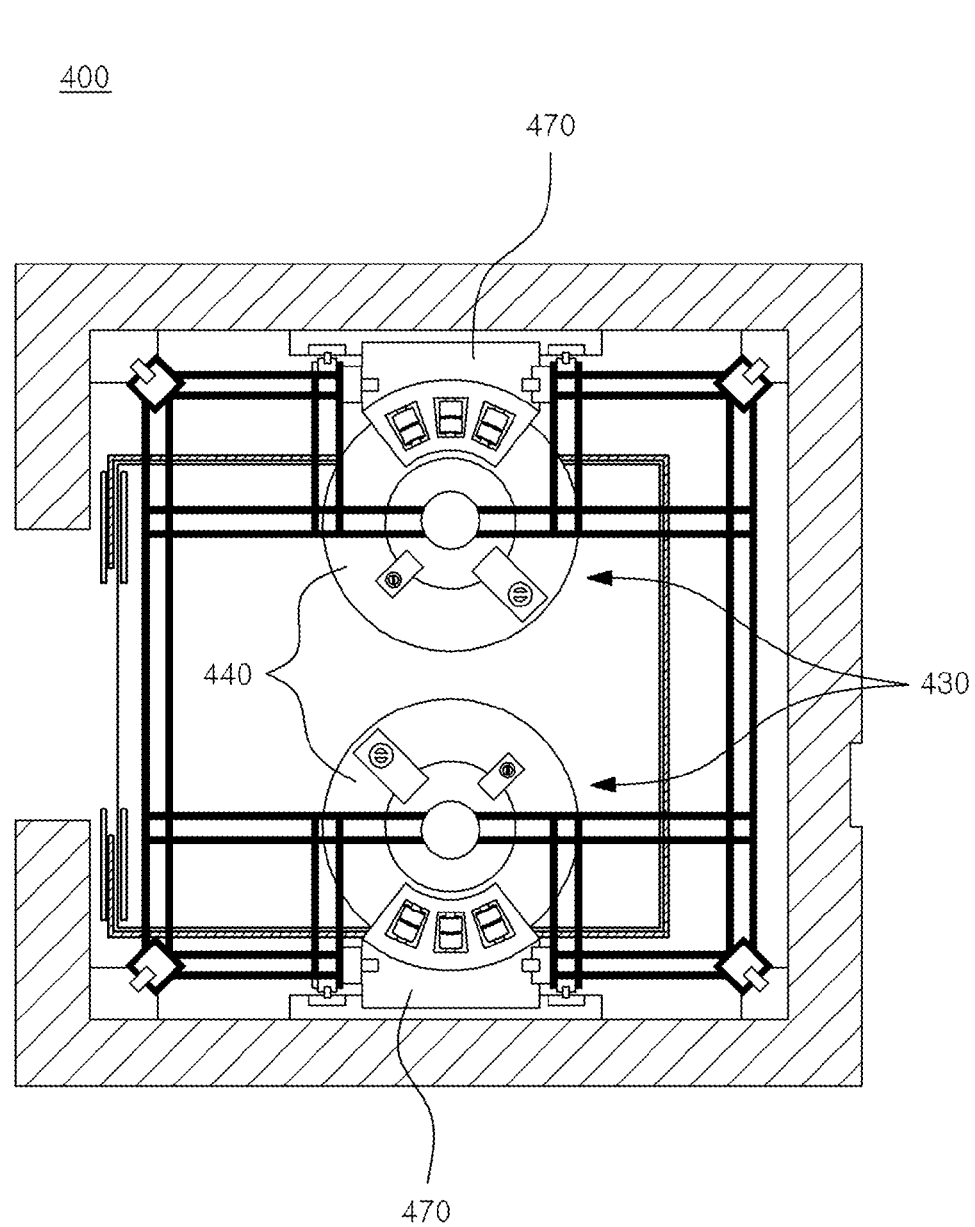
FIG. 11 is a plan view illustrating an elevator according to one embodiment of the present invention.

FIG. 11 is a plan view illustrating an elevator according to one embodiment of the present invention.

Referring to FIG. 11, an elevator 400 comprises a worm driving part 430 which includes plurality of worm gear bodies 440. Each of the worm gear bodies 440 may include an inner driving module inside itself. Otherwise, one of the worm gear bodies 440 may include an inner driving module, and the other may be operated passively. In this instance, worm support part 470 may be provided on two sides according to the worm gear bodies 440 respectively. According to another embodiment, even if not shown through drawings, a driving motor may be provided in the middle of the worm gear bodies to operate the worm gear bodies simultaneously.

Figure 12:
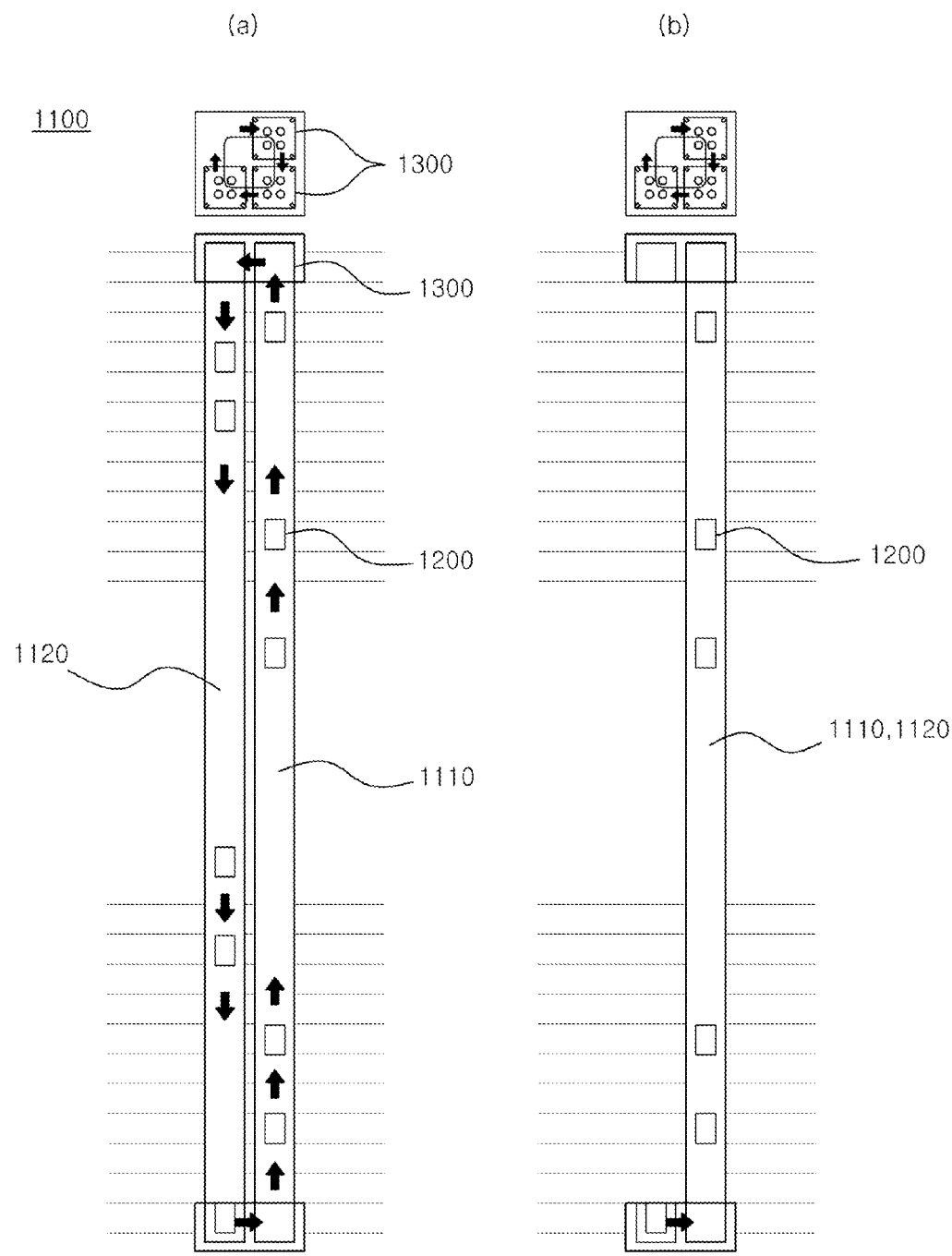
FIG. 12 is a schematic view illustrating a circulating elevating system according to one embodiment of the present invention.
Figure 13:
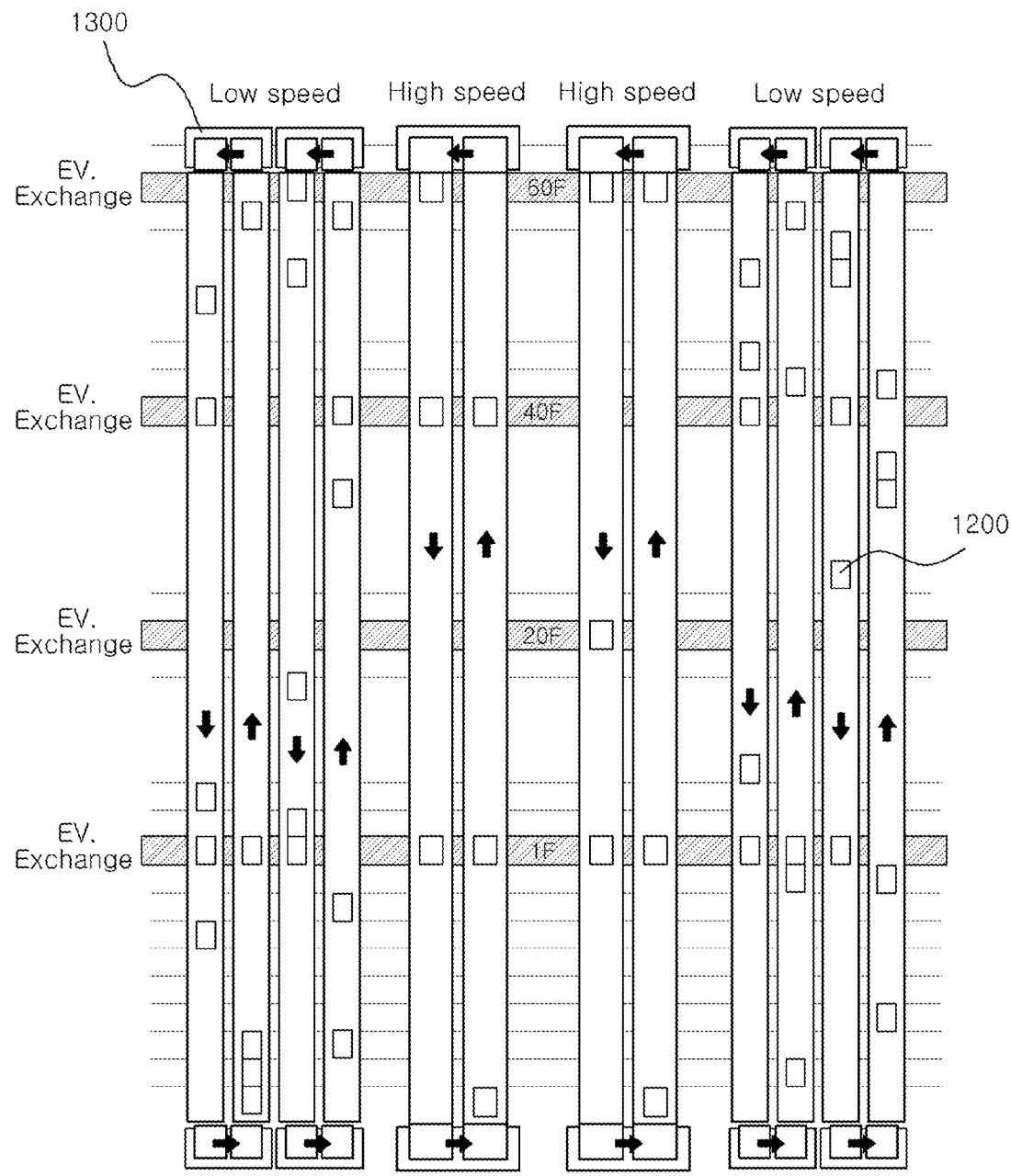
FIG. 13 is a schematic view illustrating a circulating elevating system in a building.
Figure 14:
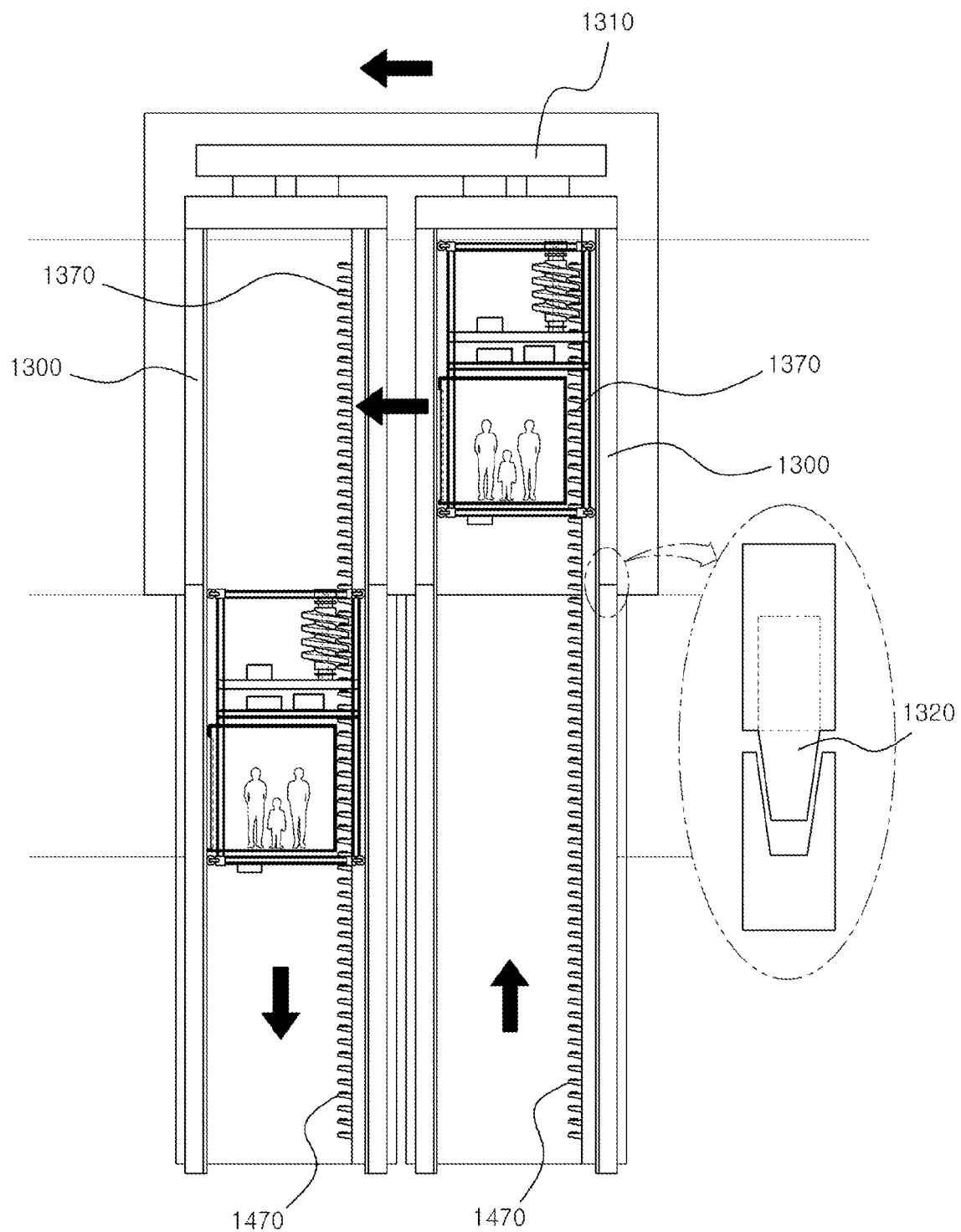
FIG. 14 is an enlarged front view illustrating the upper section of the elevating system of FIG. 12.
Figure 15:
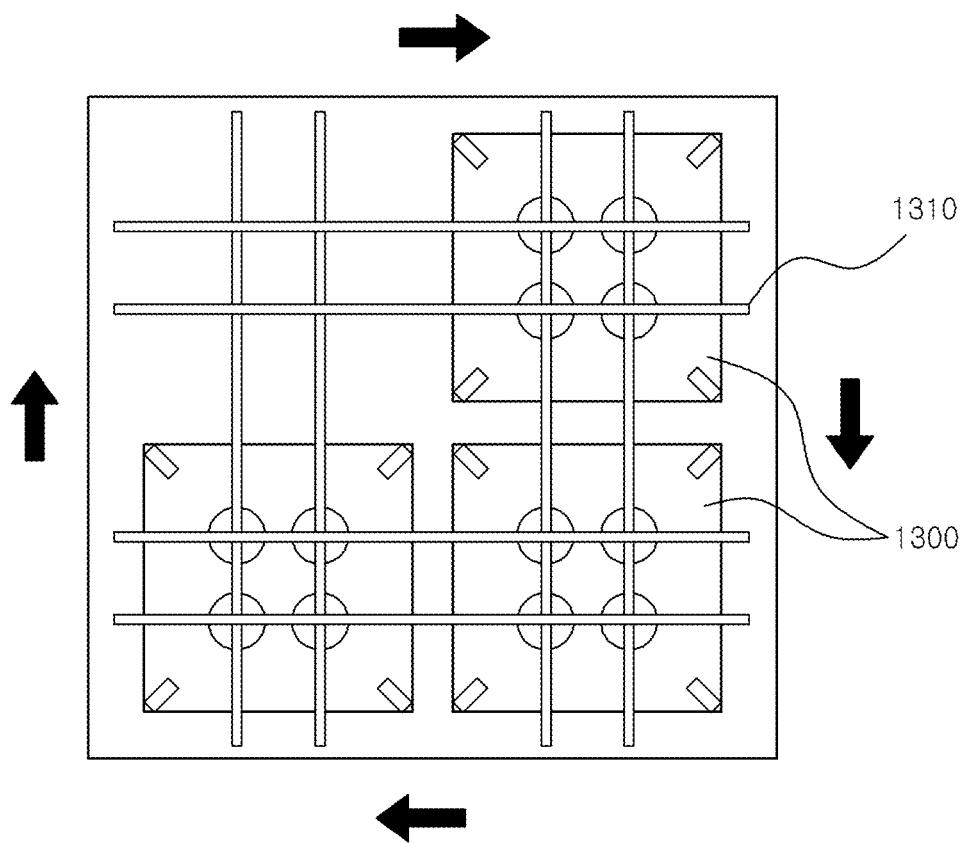
FIG. 15 is a plan view illustrating the upper section of the elevating system of FIG. 12.

FIG. 12 is a schematic view illustrating a circulating elevating system according to one embodiment of the present invention, FIG. 13 is a schematic view illustrating a circulating elevating system in a building, FIG. 14 is an enlarged front view illustrating the upper section of the elevating system of FIG. 12, and FIG. 15 is a plan view illustrating the upper section of the elevating system of FIG. 12.

In FIG. 12, the left figure (a) illustrates a front side of the circulating elevating system, and the right figure (b) illustrates a left side of the circulating elevating system.

Referring to FIGS. 12 to 15, a circulating elevating system 1100 may be equipped in a building which includes two or more of elevator shafts. Though the present embodiment supposes that a first elevator shaft is used for a lifting passage and a second elevator shaft is used for a descending passage, the present invention will not be limited by this embodiment and various combinations may be applied to other embodiments.

The elevating system 1100 comprises a ropeless elevator 1200 and a switch frame 1300. In this embodiment, the ropeless elevator 1200 preferably comprises a worm driving part as mentioned the above, however other ropeless elevators using other driving elements, such as linear motor or rack-and-pinion, may be applied to the elevating systems of the present invention.

The elevator 1200 moves up in the first elevator shaft 1110 and, after arriving at the top, transfers to the second elevator shaft 1120 or another elevator shaft through the switch frame 1300. The switch frame 1300 provided at the top end of the second elevator shafts includes a bottom opened downwardly, to allow the ropeless elevator 1200 to enter through its bottom. After the switch frame 1300 finishes its movement, it can dispatch the elevator 1200 downwardly.

As shown in the drawing, the elevator 1200 moves down in the second elevator shaft 1120 and enters into another switch frame 1300 located at the bottom of the elevator shaft. The elevator 1200, after entering into the bottom switch frame 1300, transfers to the first elevator shaft 1110 together with the bottom switch frame 1300. The elevator 1200 transferred can move up along the first elevator shaft 1110.

In this embodiment, three of the switch frames 1300 horizontally circulate to position at the top or the bottom of the first elevator shaft 1110 and the second elevator shaft 1120. At the top of the elevator shafts, one of the switch frames 1300 receives one elevator 1200 and then moves to another elevator shaft. Into the empty position, another switch frame 1300 enters to be ready to receive another elevator 1200. The switch frame 1300 which moved with the elevator 1200 is ready to dispatch the elevator 1200 downwardly.

The switch frames 1300 circulate clockwise or counterclockwise at the top level while receiving the elevators successively, to buffer the elevator, and the variously shaped rails, such as a rotary rail or a square rail.

Referring to FIG. 13, one or more of the circulating elevating system may be provided in one building. The circulating elevating system may be applied to the building together with another type circulating system or the conventional rope-type elevating system.

The circulating elevating system may be divided into high-speed and low-speed according to its speed. The high-speed circulating elevator or the high-speed shuttle elevator may be designed to pass by specific floors, not to pass by all the floors.

In the circulating elevating system, two or more of the ropeless elevators 1200 can travel independently in one elevator shaft, and since they move substantially in the same direction, passengers don't need to wait for the elevator in a long time.

Referring to FIG. 14, the switch frame 1300 moves on a specific elevator shaft, and then a coupling portion 1320 is protruded at the top or bottom end of the switch frame 1300 to make the switch frame 1300 be locked on the elevator shaft. After locking, a main guide 1470 and an extension guide 1370 are aligned in a row to enable the elevator 1200 to enter into the switch frame 1300.

In the present embodiment, the switch frame 1300 includes the extension guide 1370 which is shaped of a worm supporting teeth or a rack gear, in which the extension guide 1370 is installed in the switch frame 1300 to move together with it. The worm driving part of the elevator 1200 may transfer smoothly from the main guide 1470 to the extension guide 1370. According to other embodiments of the present invention, the extension guide may be provided on the wall of the elevator shaft, not in the switch frame, so that it may be separated from the worm driving part when the switch frame 1300 moves.

Figure 16:
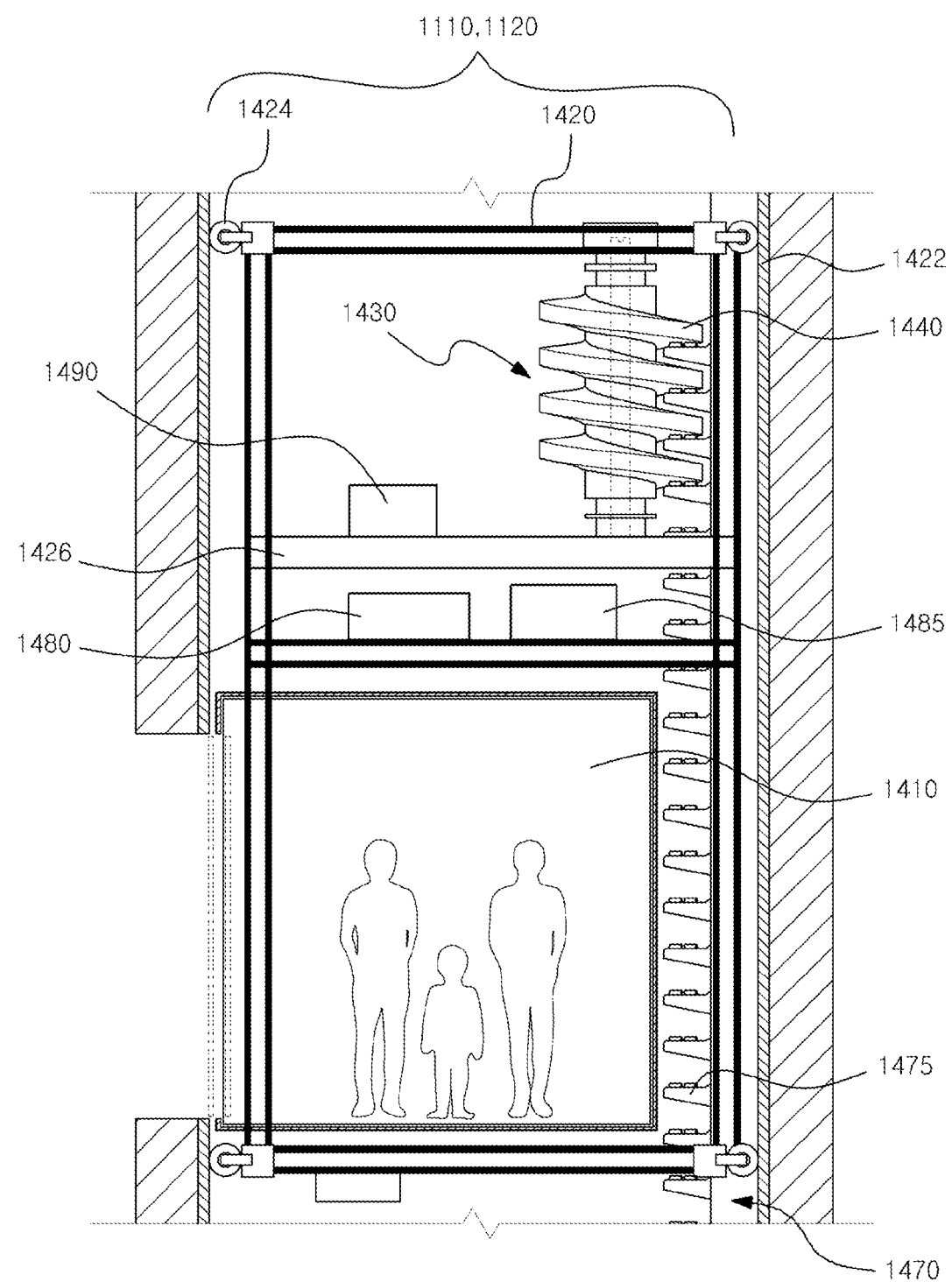
FIG. 16 is a front sectional view illustrating the ropeless elevator of the FIG. 12.
Figure 17:
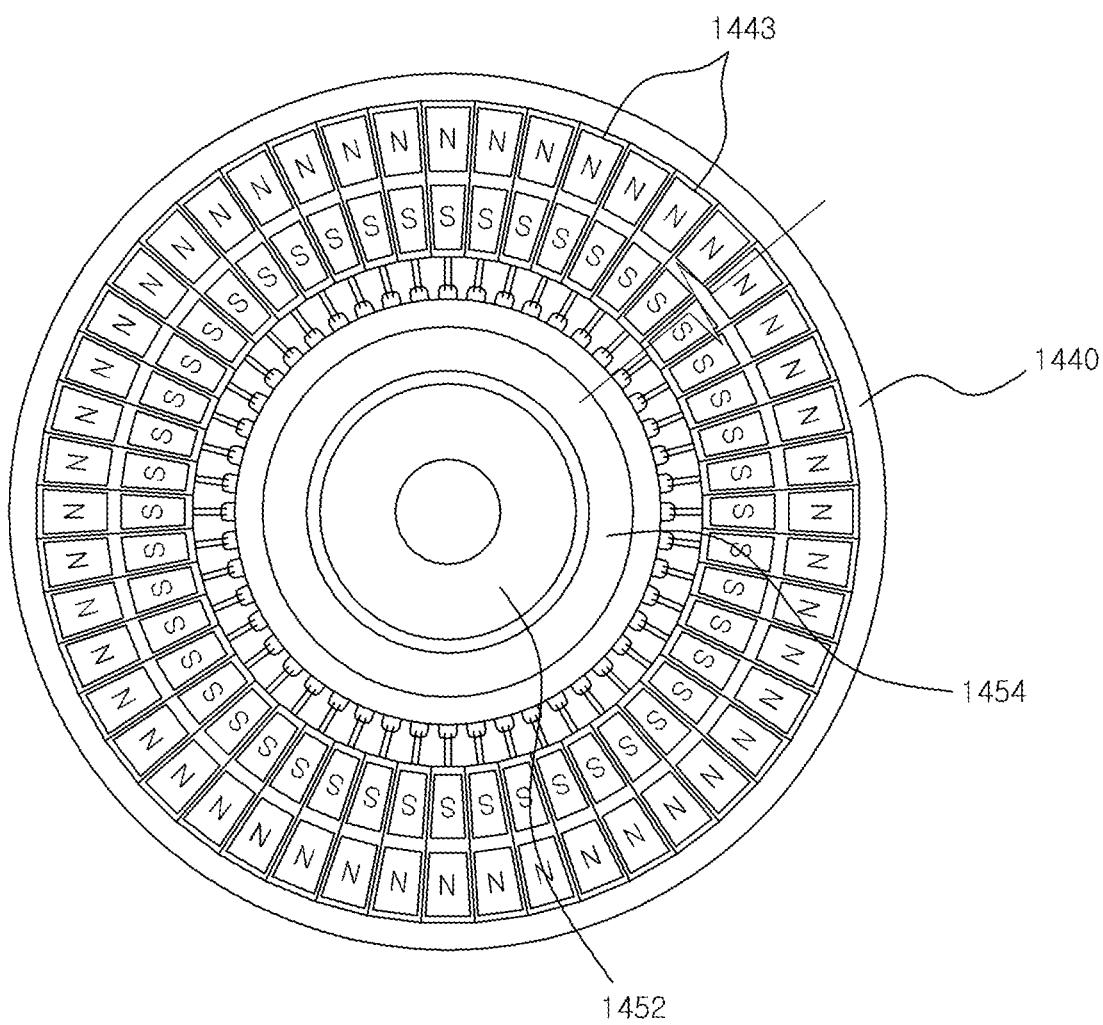
FIG. 17 is a plan view illustrating the worm driving part of the ropeless elevator of FIG. 16.
Figure 18:
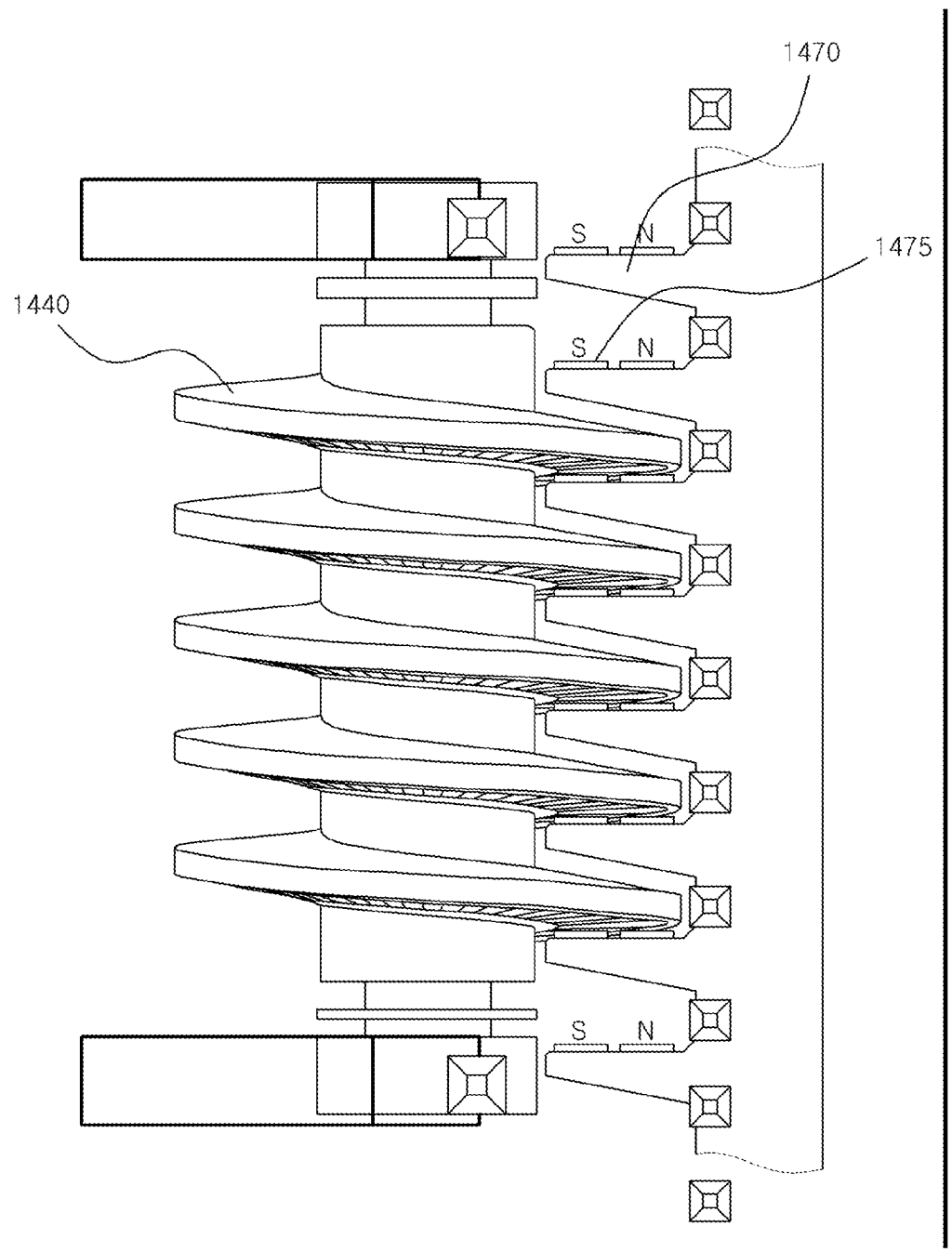
FIG. 18 is a front view illustrating the worm driving part of the ropeless elevator of FIG. 16.
Figure 19:
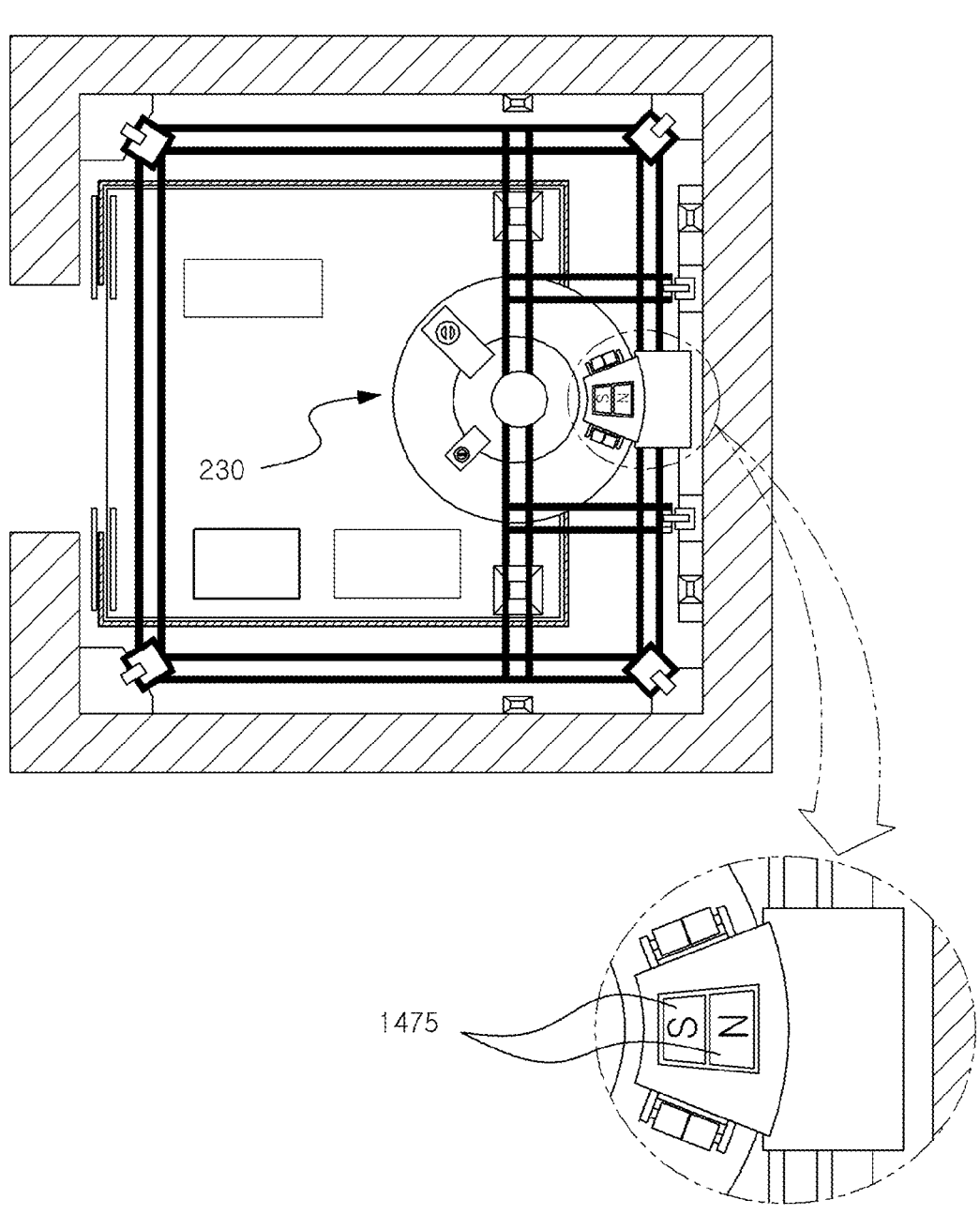
FIG. 19 is a plan view illustrating the elevator of FIG. 16.

FIG. 16 is a front sectional view illustrating the ropeless elevator of the FIG. 12, FIG. 17 is a plan view illustrating the worm driving part of the ropeless elevator of FIG. 16, FIG. 18 is a front view illustrating the worm driving part of the ropeless elevator of FIG. 16, and FIG. 19 is a plan view illustrating the elevator of FIG. 16.

Referring to FIGS. 16 to 19, the ropeless elevator 1400 comprises a car 1410, an elevating frame 1420, a worm driving part 1430 and a worm support part 1470, in which the car 1410 of the elevator 1400 travels along an elevator shaft in a building by interaction between the worm driving part 1430 and the worm support part 1470. The elevator 1400 may further comprises an independent control part 1480, an air conditioner 1485 and a wireless communication module 1490, to help a normal operation of the elevator 1400.

The worm driving part 1430 includes a worm gear body 1440 in a shape of a worm gear, on outer surface of which worm teeth 1442 are formed. The worm gear body 1440 has a rotating axis aligned parallel to a moving path of the elevator 1400 to rotate around the rotating axis. Against the worm teeth 1442 of the worm driving part 1440, the worm support part 1470 is provided in the elevator shaft, and the worm teeth 1442 and the worm support part 1470 may include a permanent magnet or electromagnetic coil to form attraction force or repulsion force between the two elements.

The worm driving part 1430 make the worm gear body 1440 rotate over or under the elevator, and the worm teeth of the worm gear body 1440 may levitate over supporting teeth of the worm support part 1470 by repulsion force. As the worm gear body 1440 rotates, the worm driving part 1430 levitates over the supporting teeth to slidingly move up or down with the car 1410.

As shown in FIG. 17, magnet modules 1443 are installed in the worm teeth, which may be provided using electromagnetic coils. Though a permanent magnet may be used instead of the electromagnetic coil, the electromagnetic coils is favorable for controlling magnetic parameters, such as force, polarity, power control and the like. In case of an accident like power failure, the worm diving part may lose its magnetic force to directly contact with the worm support part for emergency stop. To secure basic magnetic force, the worm driving part or the worm support part includes a permanent magnet, which can be harmonized with the neighboring electromagnet. In the drawing, the reference characters like N and S represents their polarities, and do not limit the polarity directions and the kind of the magnetic materials such as permanent magnet or electromagnet, in other embodiments of the present invention.

In the present embodiment, the magnetic modules 1443 are installed in a groove, a hole or any electric box at the worm teeth and are electrically connected with the worm gear body. The magnet module 1443 may be provided as an electronic module component to be easily mounted, separated and replaced.

Since the worm driving part 1430 moves together with the car 1410, the elevator 1400 needs neither rope nor wire, and needs neither machine room nor traction machine. Namely, the worm driving part 1430 may be installed over or under the car 1410 to move the car 1410 upwardly or downwardly independently.

Accordingly, the elevator 1400 may have a simplified driving structure and may be free from the many burdens like a huge rope weight in a high-rise building. The elevator 1400 may be free from the other burdens like interference between the ropes and installation of balance weights.

In view of efficiency, low resistance like magnet levitation is formed between elements, so that the rotation energy of the worm driving part can be transferred into potential energy of the car with reduced energy consumption. Going down of the elevator needs minimal energy to control the speed or stop position of the car. The worm driving part 1430 may perform initial acceleration, low speed control, high speed control and deceleration very easily via general motor control method.

Supposing the worm gear body 1440 proceeds by one pitch of about 25~40 cm for one turning, the worm driving part 1430 rotating at speed of about 2,000 rpm can move at speed of about 500~800 m/min. An ultrahigh-speed elevator can be easily realized by the worm driving part.

A twin elevating system which carries two or more of cars 1410 in one elevator shaft can be realized in the present embodiment. Because of using no rope, two or more of the cars 1410 can travel independently in the identical elevator passage and be controlled through the wireless communication module 1490 installed on the cars 1410 respectively. Especially, since there is no obstacle in the straight elevator shaft, the wireless communication between the cars 1410 may be very easy and prompt.

Supposing the worst accidents like power failure or brake failure, the car 1410 would not fall powerlessly. Due to structural characteristic of the worm gear, the car's lowering loses its speed or stops even if the motor stops. In case that the elevator keeps going down, it moves down slowly enough to protect the passengers. A disc brake formed around the rotating axis of the worm gear body may stop the worm driving part safely.

The car 1410 guided by the elevating frame 1420 may move stably in the elevator shaft, and the rollers 1424 positioned at corners of the elevating frame 1420 can guide the car 1410 in the elevator shaft without rattling. In the present embodiment, the worm driving part 1430 is mounted on a support frame 1426, and the car 1410 and the elevating frame 1420 move together by the worm driving part 1430. Similarly to the conventional elevator guide structure, T-shaped rail may be installed in the elevator shaft parallel to the moving path of the car 1410.

The elevating frame 1420 for protecting the car 1410 may also move with the car 1410 and enter into the switch frame 1300. In this instance, the switch frame 1300 may provide rollers and rails for the elevating frame 1420.

The worm driving part 1430 of the present embodiment includes a motor member inside the worm gear body 1440, though a driving motor and a transmission can by mounted outside the worm gear body in other embodiments. The worm gear body 1440 may be formed as a hollow body to contain the inner motor member and have the top and the bottom ends mounted on bearings. The inner motor member includes a stator 1452 provided on a rotating axis and a rotator 1454 provided on an inner side of the worm gear body 1440. The stator 1452 and the rotator 1454 may be provided as a combination of permanent magnet and electromagnetic coil or as a combination of electromagnetic coils.

The worm teeth of the worm gear body 1440 are supported on the rollers 1475 which is exposed from the top of the supporting teeth 1472, and slide on the rollers 1475 of the worm support part 1470 while the worm gear body 240 rotates to go up and down with the car 1410.

The worm support part 1470 includes magnets or electromagnets arranged by a uniform gap. Around every supporting tooth of the worm support part 1470, auxiliary wheels may be provided to prevent the worm teeth from contacting directly with the supporting teeth of the worm support part 1470, so that the auxiliary wheels can protect the magnet module or magnetic materials installed in the worm teeth and the supporting teeth.

Figure 20:
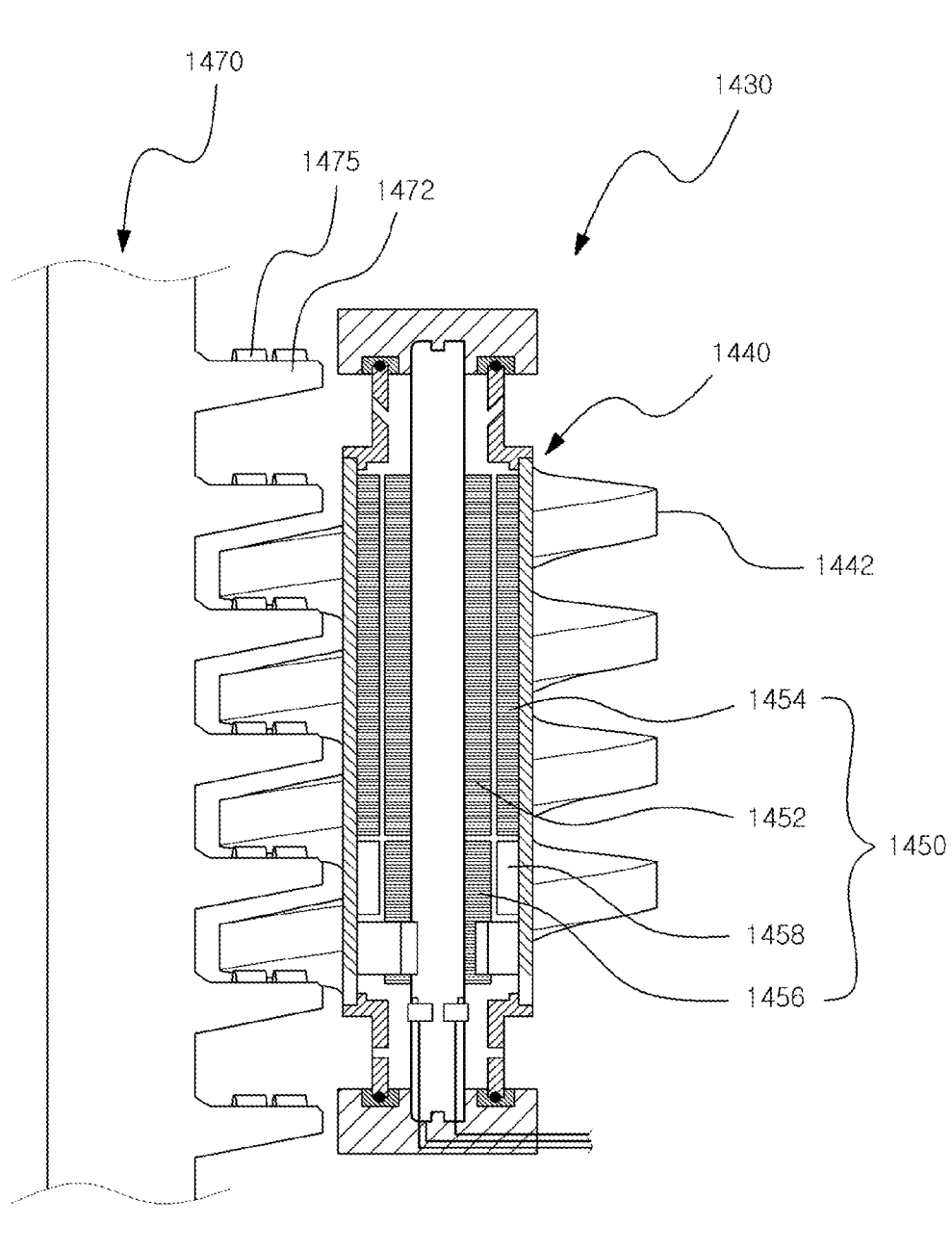
FIG. 20 is a sectional view illustrating inside of a worm driving part.

FIG. 20 is a sectional view illustrating inside of a worm driving part.

Referring to FIG. 20, an inner driving module 1450 formed inside the worm gear body 1440 includes two pairs of the stator and the rotator. The worm gear body 1440 is provided as a hollow body to contain the inner driving module. Inside the worm gear body 1440, a coil stator 1452 and a coil rotator 1454 are provided at upper portion in the worm gear body 1440, and another coil stator 1456 and a magnet rotator 1458 are provided at lower portion. In other embodiments, coil stator or coil rotator may be provided by using coil or steel-core.

The worm driving part can control the rotating torque and speed of the worm gear body 1440, by using the stators and the rotators, and expect induction generating by the rotation of the worm gear body 1440 when moving down. For example, in case that the elevator moves down, the rotation of the rotator around the stator can cause electricity generation to be useful for the efficient use of energy.

Figure 21:
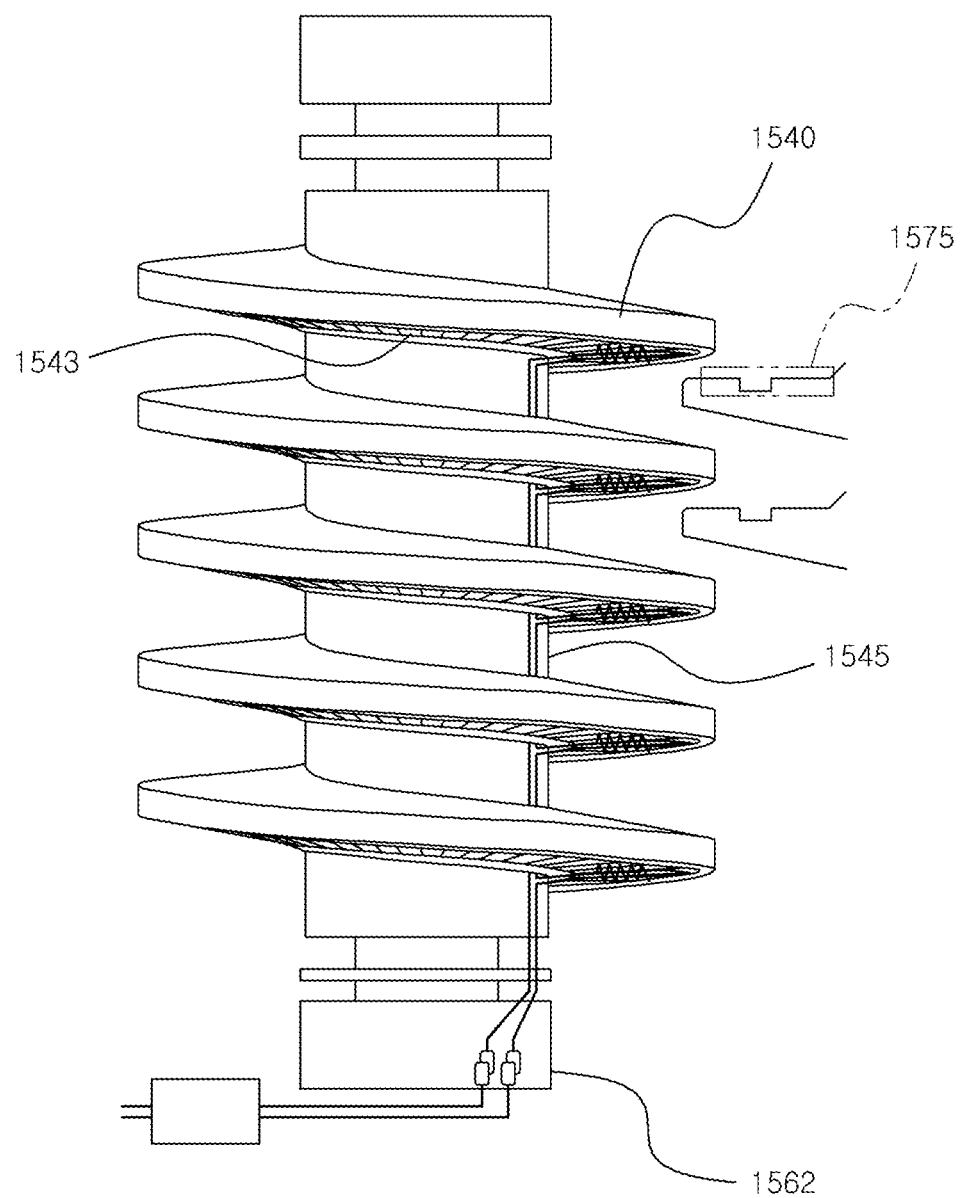
FIG. 21 is a front view illustrating a worm driving part according to another embodiment of the present invention.

FIG. 21 is a front view illustrating a worm driving part according to another embodiment of the present invention.

Referring to FIG. 21, when electric power is supplied to all the coil modules 1543 of worm teeth in a worm gear body 1540, it results that electric power is consumed more that needs.

Therefore, as shown in the drawing, the coil modules 1543 which are arranged on the same vertical row may be electrically interlocked and be powered at the same time. In this instance, lower contact terminals 1562 are formed along the outer surface of lower portion of the worm gear body 1540 by a uniform distance to be used to selectively turn on or turn off the coil modules 1543 vertically arranged.

One or more of the contact terminals 1562 can be connected with outer power supply at the same time. The contact terminals 1562 electrically connected at the same time may be positioned in an angle of below 30~40°, preferably in an angle of below 10°.

The worm support part may also include electromagnetic coils which can be partially powered according to location of the worm driving part moving along the worm support part. For example, when the elevator passes a specific floor along the worm support part 1570, the supporting teeth located at just above and below floors may be powered selectively, occasionally at just above two floors and just one floor.

Figure 22:
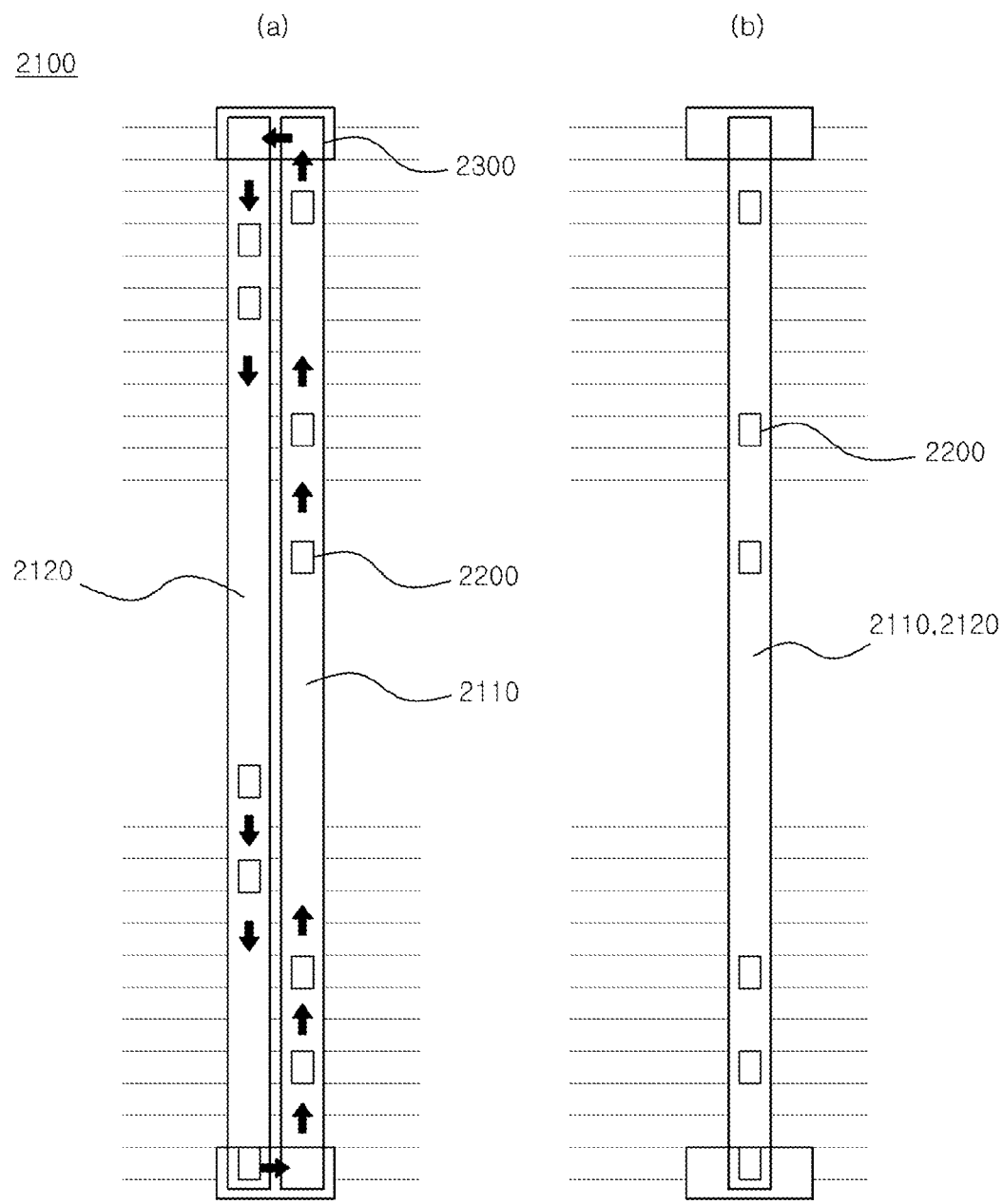
FIG. 22 is a schematic view illustrating a circulating elevating system according to one embodiment of the present invention.
Figure 23:
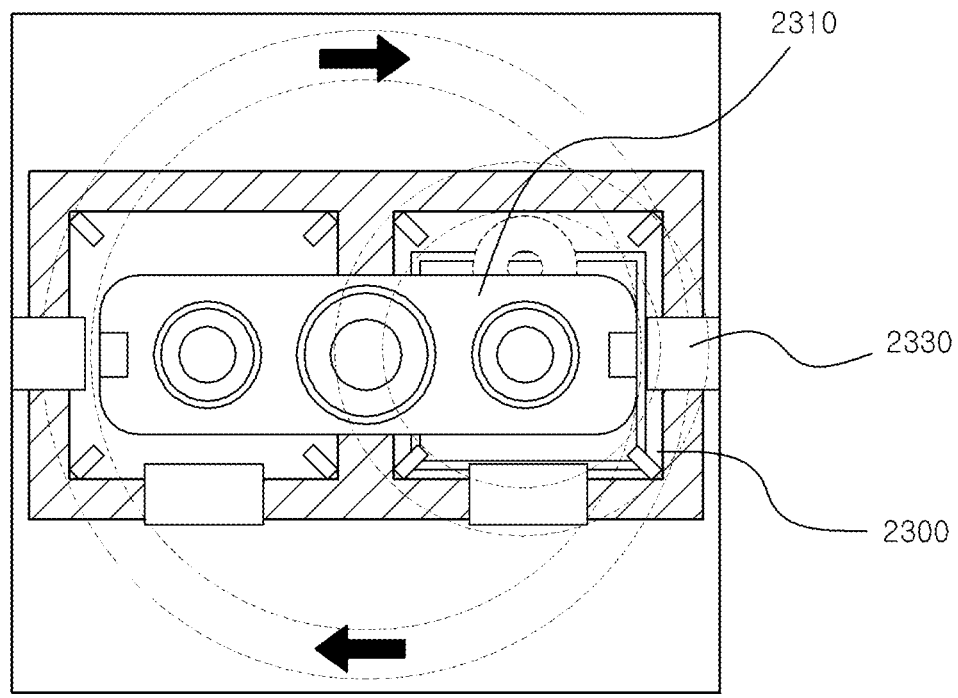
FIG. 23 is a plan view illustrating an elevator of FIG. 22.
Figure 24:
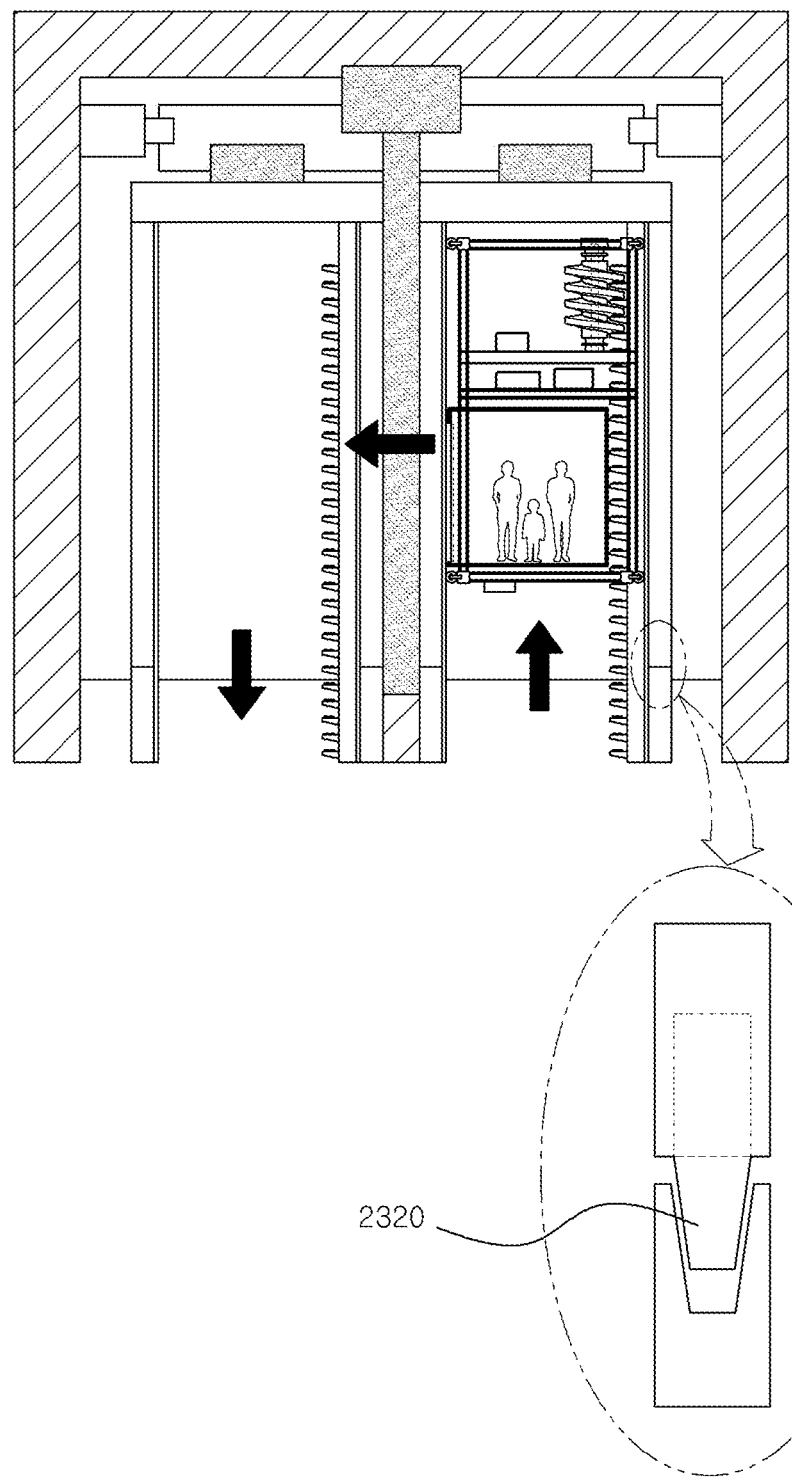
FIG. 24 is an enlarged front view illustrating the upper section of the elevating system of FIG. 22.

FIG. 22 is a schematic view illustrating a circulating elevating system according to one embodiment of the present invention, FIG. 23 is a plan view illustrating an elevator of FIG. 22, and FIG. 24 is an enlarged front view illustrating the upper section of the elevating system of FIG. 22.

Referring to FIGS. 22 to 24, a circulating elevating system 2100 comprises switch frames 2300 located at the top and the bottom of elevator shafts, which turn like a turntable. The top portion of the switch frame 2300 may be mounted on a turntable, and the switch frame 2300 can transfer the elevator 2200 received in the switch frame 2300 by turning, from a first elevator shaft 2110 to a second elevator shaft 2120.

If the elevator is fixed in the switch frame, the door of the elevator may turn about after the transfer of the switch frame. Accordingly, when the turntable turns about, the switch frame 2300 can have the car turn half to direct the door properly. To fix the turntable, two fixing member 2330 may be provided at both side of the turntable and coupling portion 2320 are provided at the bottom end of the switch frame 2300 to be selectively protruded to make the switch frame 2300 be locked.

According to another embodiment, three or more switch frames may be equipped on one turntable or turn bar, so as to transfer plurality of elevators at one time.

As the above mentioned, however the explanation refers to desirable exemplary embodiments of this invention, present invention may be comprehended to be modified and changed within the idea and domain of this invention reported in the claims to expert dealer in this technology.

The invention claimed is:

1. An elevator moving along a lifting space in a building, the elevator comprising:
   a car for transport moving along the lifting space;
   a worm driving part moving together with the car, a rotating axis of which is parallel to a moving path of the car; and
   a worm support part including supporting teeth installed in the lifting space along the moving path of the car in accordance with worm teeth of the worm driving part;
   wherein the worm driving part includes a worm gear body providing the worm teeth and an inner driving member for rotating the worm gear body inside the worm gear body,
   wherein the inner driving member includes a stator provided on the rotating axis fixed to the car and a rotator provided on an inner side of the worm gear body,
   wherein the worm gear body rotates around the rotating axis by interaction between the stator and the rotator, and
   wherein the inner driving member includes two or more pairs of the stator and the rotator, in which at least one pair of the stator and the rotator is designed to produce electric power using current induction when the car goes down.

2. The elevator of claim 1, wherein the worm driving part and the worm support part use rolling contact.

3. The elevator of claim 1, wherein the worm driving part and the worm support part use magnetic force.

4. The elevator of claim 3, wherein the worm driving part and the worm support part use attraction force or repulsion force between magnetic coils.

5. The elevator of claim 1, wherein at least one pair of the stator and the rotator is designed to cause cogging to decelerate the car when power failure.

6. The elevator of claim 1, further comprising a wireless communication module for a communication with a central control system or another neighboring elevator.

* * * * *